United States Patent
Furuta

(10) Patent No.: US 11,919,521 B2
(45) Date of Patent: Mar. 5, 2024

(54) PREVIEW DAMPING CONTROL APPARATUS FOR VEHICLE AND PREVIEW DAMPING CONTROL METHOD FOR VEHICLE

(71) Applicant: Toyota Jidosha Kabushiki Kaisha, Toyota (JP)

(72) Inventor: Hiroki Furuta, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 240 days.

(21) Appl. No.: 17/172,748

(22) Filed: Feb. 10, 2021

(65) Prior Publication Data
US 2021/0276566 A1  Sep. 9, 2021

(30) Foreign Application Priority Data

Mar. 4, 2020  (JP) .................... 2020-036489

(51) Int. Cl.
| | |
|---|---|
| *B60W 40/06* | (2012.01) |
| *B60G 17/06* | (2006.01) |
| *B60W 10/18* | (2012.01) |
| *B60W 10/20* | (2006.01) |
| *B60W 10/22* | (2006.01) |
| *B60W 50/00* | (2006.01) |

(Continued)

(52) U.S. Cl.
CPC ............ *B60W 40/06* (2013.01); *B60G 17/06* (2013.01); *B60W 10/18* (2013.01); *B60W 10/20* (2013.01); *B60W 10/22* (2013.01); *B60W 50/0097* (2013.01); *B60W 60/001* (2020.02); *G01C 21/3407* (2013.01); *B60G 2400/25* (2013.01); *B60G 2400/82* (2013.01)

(58) Field of Classification Search
CPC .... B60W 40/06; B60W 60/001; B60W 10/18; B60W 10/20; B60W 10/22; B60W 50/0097; B60G 17/06; B60G 2400/25; B60G 2400/82; G01C 21/3407
See application file for complete search history.

(56) References Cited

U.S. PATENT DOCUMENTS

| 6,484,093 B1 | 11/2002 | Ito et al. |
| 2010/0324780 A1 | 12/2010 | Koumura et al. |

(Continued)

FOREIGN PATENT DOCUMENTS

| DE | 102013016974 A1 | 3/2014 |
| DE | 102013210553 A1 | 12/2014 |

(Continued)

OTHER PUBLICATIONS

English translation of JP-2017226270-A.*

(Continued)

*Primary Examiner* — Anshul Sood
*Assistant Examiner* — Matthew Ho
(74) *Attorney, Agent, or Firm* — Dinsmore & Shohl LLP

(57) ABSTRACT

The preview damping control includes an ECU. When the vehicle is traveling within a communications disruption area in which a radio communication device is hard to communicate with a cloud, the ECU uses road surface displacement correlating information that has been stored in an on-board memory device in advance for the communications disruption area so as to perform a preview damping control.

6 Claims, 12 Drawing Sheets

(51) Int. Cl.
*B60W 60/00* (2020.01)
*G01C 21/34* (2006.01)

(56) References Cited

U.S. PATENT DOCUMENTS

| | | |
|---|---|---|
| 2017/0100980 A1 | 4/2017 | Tsuda |
| 2018/0154723 A1* | 6/2018 | Anderson .............. H02K 11/33 |
| 2018/0231977 A1 | 8/2018 | Uno |
| 2019/0079539 A1 | 3/2019 | Sridhar et al. |
| 2019/0250612 A1 | 8/2019 | Yamamuro et al. |
| 2019/0281429 A1 | 9/2019 | Nishizaki et al. |
| 2021/0262815 A1* | 8/2021 | Lee ...................... G01C 21/367 |

FOREIGN PATENT DOCUMENTS

| | | | | |
|---|---|---|---|---|
| EP | 2658211 A1 | * | 10/2013 | ............. G01C 21/34 |
| JP | 2001147132 A | | 5/2001 | |
| JP | 2009-096366 A | | 5/2009 | |
| JP | 2014-165567 A | | 9/2014 | |
| JP | 2016-107778 A | | 6/2016 | |
| JP | 2017-071310 A | | 4/2017 | |
| JP | 2017226270 A | * | 12/2017 | |
| JP | 2017226270 A | | 12/2017 | |
| JP | 2018-096913 A | | 6/2018 | |
| JP | 2018105724 A | * | 7/2018 | |
| JP | 2018-132985 A | | 8/2018 | |
| JP | 2019137356 A | | 8/2019 | |
| JP | 2019-161378 A | | 9/2019 | |

OTHER PUBLICATIONS

English translation of JP-2018105724-A.*
German Patent Application No. 10 2021 104 969.5 Office Action dated Feb. 9, 2022.

* cited by examiner

PREVIEW DAMPING CONTROL APPARATUS FOR VEHICLE AND PREVIEW DAMPING CONTROL METHOD FOR VEHICLE

CROSS-REFERENCE TO RELATED APPLICATION

This application claims priority to Japanese Patent Application No. JP 2020-036489 filed on Mar. 4, 2020, the content of which is hereby incorporated by reference in its entirety into this application.

TECHNICAL FIELD

The present disclosure relates to a preview damping control apparatus for a vehicle and a preview damping control method for a vehicle.

BACKGROUND

A conventional apparatus configured to acquire a vertical displacement of a road surface at a position which a wheel of a vehicle is predicted to reach (or a position which the wheel of the vehicle is predicted pass/go through) and perform a damping control (hereinafter, sometimes referred to as a "preview damping control") for a sprung member (mass) of the vehicle based on the acquired vertical displacement of the road surface is disclosed in U.S. Unexamined Patent Application Publication No. 2019/0079539 and in U.S. Unexamined Patent Application Publication No. 2018/0154723.

The conventional apparatus successively acquires the vertical displacement of the road surface, that is used for the preview damping control, from a cloud through communication instead of a preview sensor configured to obtain (or actually detect) the vertical displacement of the road surface at a position ahead of the vehicle, so as to perform the preview damping control.

In short, the conventional apparatus is configured to carry out the preview damping control without using the preview sensor.

SUMMARY

However, when the vehicle is traveling in an area/section (communications disruption area) where the vehicle is hard to communicate with outside of the vehicle (e.g., when the vehicle is in a tunnel), the information necessary for the preview damping control cannot be acquired from the cloud due to communications disruption. Thus, the conventional apparatus cannot perform the preview damping control, while the vehicle is traveling in the communications disruption area.

The present disclosure is made to cope with the problem described above. One of objectives of the present disclosure is to provide a preview damping control apparatus for a vehicle that is capable of performing the preview damping control and to provide a preview damping control method for a vehicle that can be used to perform the preview damping control, even when the vehicle is traveling in the communications disruption area.

Hereinafter, the preview damping control apparatus according to the present disclosure may sometimes be referred to as a "present disclosure preview damping control apparatus", and a preview damping control method according to the present disclosure may sometimes be referred to as a "present disclosure preview damping control method".

The present disclosure preview damping control apparatus comprises:
  a communication device configured to be able to communicate with outside of the vehicle;
  a control force generating device configured to generate a control force to a part corresponding to at least one of wheels of the vehicle to damp a vibration of a sprung mass of the vehicle;
  a control unit configured to perform a preview damping control to damp the vibration of the sprung mass by letting the control force generating device generate, at a time point at which the wheel actually reaches a predicted passing through position which the wheel is predicted to reach and which is ahead of the wheel, the control force that corresponds to a force determined based on road surface displacement correlating information that correlates with a vertical displacement of a road surface at the predicted passing through position; and
  an on-board memory device configured to be able to store the road surface displacement correlating information.

The control unit is configured to:
  obtain, through communication of the communication device, the road surface displacement correlating information from an external storage device that is located outside of the vehicle and has stored the road surface displacement correlating information, and perform the preview damping using the obtained road surface displacement correlating information, when the vehicle is traveling within a communicably area in which the vehicle can communicate with the external storage; and
  perform the preview damping control using the road surface displacement correlating information stored in the on-board memory device in advance for a communications disruption area in which the vehicle is hard to communicate with the external storage device, when the vehicle is traveling within the communications disruption area.

Accordingly, while the vehicle is traveling within the communications disruption area, the present disclosure preview damping control apparatus can use the road surface displacement correlating information that has been stored in advance in the on-board memory device. Therefore, the present disclosure preview damping control apparatus can perform the preview damping control, not only when the vehicle is traveling within the communicably area but also when the vehicle is traveling within the communications disruption area.

In some embodiments of the present disclosure preview damping control apparatus includes a navigation apparatus configured to determine a guidance route to/for a destination for providing a route guidance to a driver of the vehicle.

In addition, the control unit is configured to:
  specify (extract) the communications disruption area through which the guidance route passes;
  obtain, from the external storage device through communication of the communication device, the road surface displacement correlating information corresponding to the specified communications disruption area, when the communication device can communicate with the external storage; and
  store the obtained road surface displacement correlating information in the on-board memory device.

Therefore, the thus configured present disclosure preview damping control apparatus can more certainly store the "road surface displacement correlating information corresponding to the specified communications disruption area through which the guidance route passes" in the on-board memory device. Accordingly, a case can be prevented where the present disclosure preview damping control apparatus cannot perform the preview damping control due to lack of the road surface displacement correlating information for the communications disruption area, while the vehicle is traveling within the communications disruption area.

In some embodiments, the present disclosure preview damping control apparatus further comprises an autonomous driving control apparatus configured to perform an autonomous driving control by determining an autonomous driving route along which the vehicle is planned to travel, and to control steering, braking, and driving of the vehicle so as to let the vehicle travel along the autonomous driving route. In the embodiments, the control unit is configured to:

specify (extract) the communications disruption area through which the autonomous driving route passes;
obtain, from the external storage device through communication of the communication device, the road surface displacement correlating information corresponding to (or for) the specified communications disruption area, when the communication device can communicate with the external storage device; and
store the obtained road surface displacement correlating information in the on-board memory device.

Accordingly, the above present disclosure preview damping control apparatus can assuredly store, in/into the on-board memory device, the obtained road surface displacement correlating information corresponding to (or for) the specified communications disruption area through which the vehicle is planned to be autonomously driven. Therefore, the case can be prevented where the present disclosure preview damping control apparatus cannot perform the preview damping control due to lack of the road surface displacement correlating information for the communications disruption area, while the vehicle is traveling within the communications disruption area.

In some embodiments,
the control unit is configured to:
predict a predicted traveling route that is a route along which the vehicle is predicted to travel;
specify (extract) the communications disruption area through which the predicted traveling route passes;
obtain, from the external storage device through communication of the communication device, the road surface displacement correlating information corresponding to (or for) the specified communications disruption area, at a time point at which the vehicle reaches a position predetermined distance before the specified communications disruption area, while the communication device can communicate with the external storage device; and
store the obtained road surface displacement correlating information in the on-board memory device.

Accordingly, even when the route along which the vehicle is planned to travel has not been determined, the above disclosure preview damping control apparatus can assuredly store, in/into the on-board memory device, the road surface displacement correlating information corresponding to (or for) the specified communications disruption area through which the vehicle is predicted to travel. Therefore, the case can be prevented where the present disclosure preview damping control apparatus cannot perform the preview damping control due to lack of the road surface displacement correlating information for the communications disruption area, while the vehicle is traveling within the communications disruption area.

In some embodiments, the road surface displacement correlating information is information relating to an unsprung mass displacement that represents a vertical displacement of an unsprung mass of the vehicle.

Since the unsprung mass displacement can be detected more accurately, the above apparatus using the unsprung mass displacement as the road surface displacement correlating information can more effectively damp the vibration according to the preview damping control.

In some embodiments of the disclosure, a preview damping control method for a vehicle having a control force generating device configured to generate a control force to a part corresponding to at least one of wheels of the vehicle to damp a vibration of a sprung mass of the vehicle, comprises a preview damping control step of performing a preview damping control to let the control force generating device generate a control force that corresponds to a force determined based on road surface displacement correlating information that correlates with a vertical displacement of a road surface at a predicted passing through position which the wheel is predicted to reach and which is ahead of the wheel, so as to damp the vibration of the sprung mass caused when the wheel actually reaches the predicted passing through position.

The vehicle may comprise:
a communication device configured to be able to communicate with outside of the vehicle; and
an on-board memory device configured to store the road surface displacement correlating information.

The preview damping control step may include a first step and a second step.

The first step may include:
a step of obtaining, through communication of the communication device, the road surface displacement correlating information from an external storage device that is located outside of the vehicle and has been storing the road surface displacement correlating information, when the vehicle is traveling within a communicably area in which the vehicle can communicate with the external storage device; and
a step of using the obtained road surface displacement correlating information to perform the preview damping control, when the vehicle is traveling within the communicably area.

The second step may include:
a step of using, when the vehicle is traveling within the communications disruption area in which the vehicle is hard to communicate with the external storage device, the road surface displacement correlating information for the communications disruption area that has been stored in the on-board memory device while the vehicle is traveling within the communicably area, so as to perform the preview damping control.

According to the above method, while the vehicle is traveling within the communications disruption area, the road surface displacement correlating information that has been stored in advance in the on-board memory device can be used for the preview damping control. Therefore, according to the above method, the preview damping control can be performed, not only when the vehicle is traveling within the communicably area but also when the vehicle is traveling within the communications disruption area.

Notably, in the above description, in order to facilitate understanding of the present disclosure, the constituent elements or the like of the disclosure corresponding to those of the embodiments of the disclosure which will be described later are accompanied by parenthesized names and/or symbols which are used in the embodiments. However, the constituent elements of the disclosure are not limited to those in the embodiments defined by the names and/or the symbols.

DETAILED DESCRIPTION

<Configuration>

Figure 1:
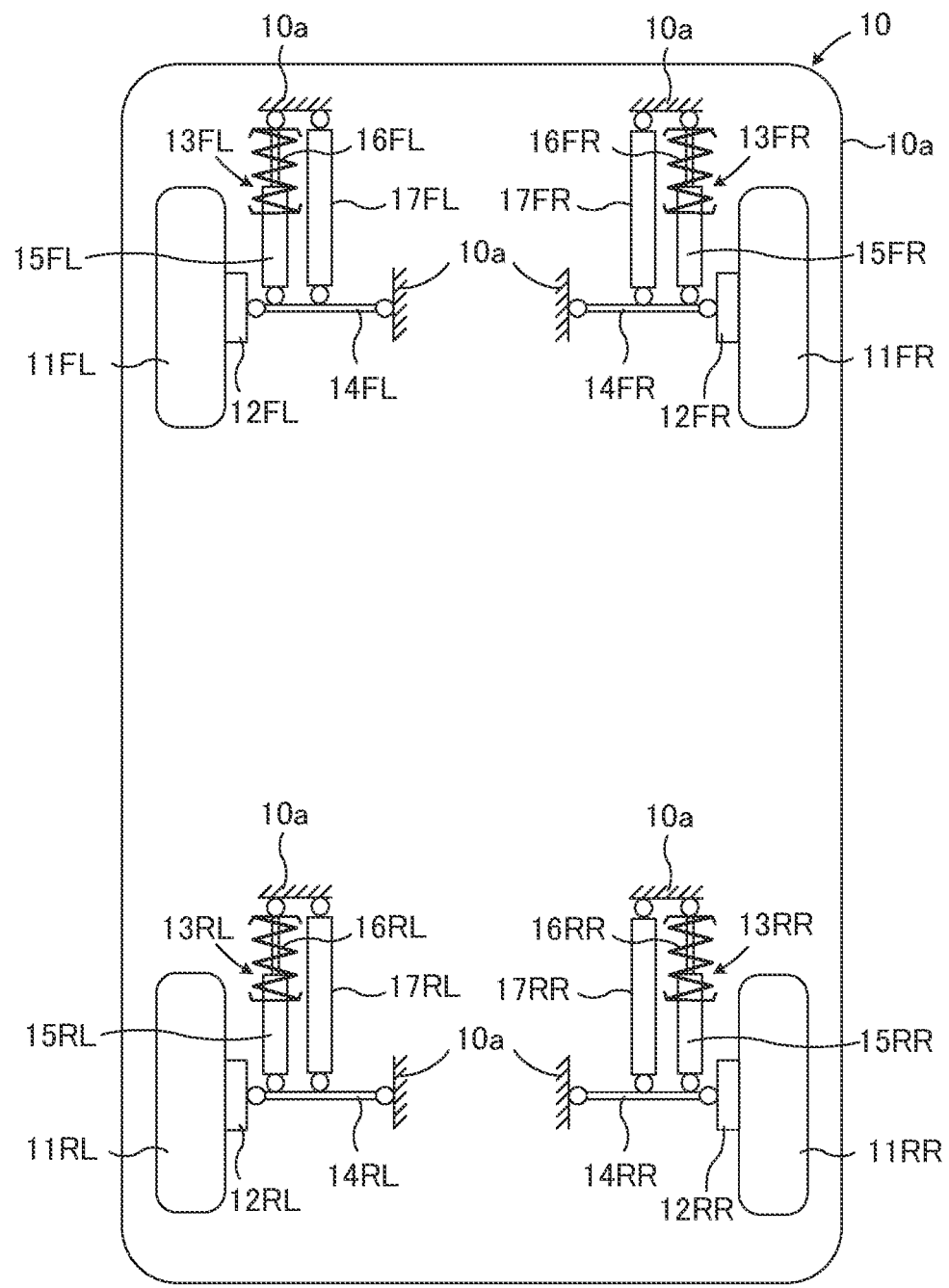
FIG. 1 is a schematic diagram of a vehicle to which a preview damping control apparatus according to an embodiment of the present disclosure is applied.
Figure 2:
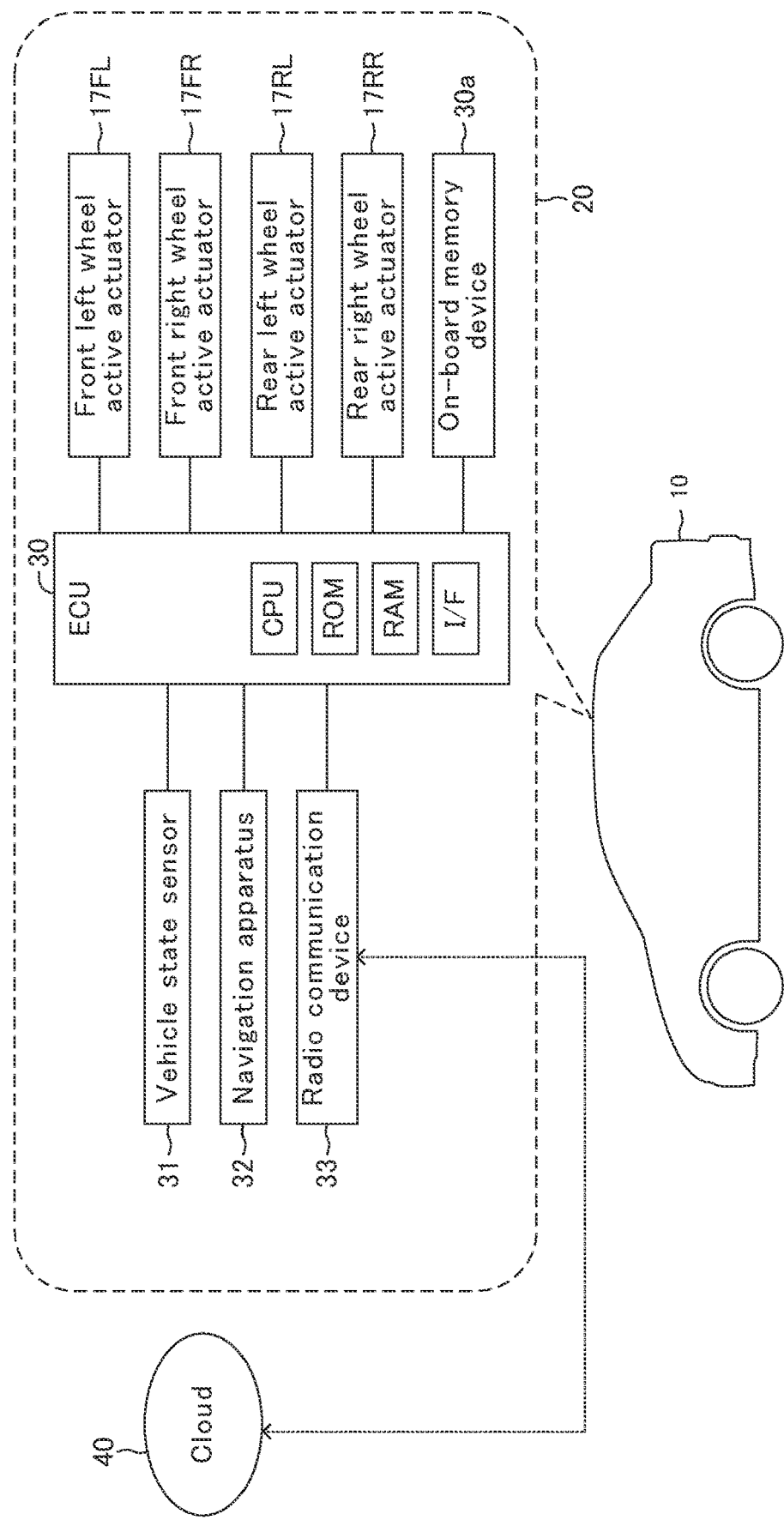
FIG. 2 is a schematic diagram of the preview damping control apparatus according to the embodiment of the present disclosure.

A preview damping control apparatus 20 for a vehicle 10 shown in FIG. 1 according to an embodiment of the present disclosure is schematically illustrated in FIG. 2. Hereinafter, the preview damping control apparatus 20 is sometimes simply referred to as a "damping control apparatus 20". The damping control apparatus 20 is applied to (installed in) the vehicle 10.

As shown in FIG. 1, the vehicle 10 comprises a front left wheel 11FL, a front right wheel 11FR, a rear left wheel 11RL, and a rear right wheel 11RR. The front left wheel 11FL is rotatably supported by a wheel supporting member 12FL. The front right wheel 11FR is rotatably supported by a wheel supporting member 12FR. The rear left wheel 11RL is rotatably supported by a wheel supporting member 12RL. The rear right wheel 11RR is rotatably supported by a wheel supporting member 12RR.

The front left wheel 11FL, the front right wheel 11FR, the rear left wheel 11RL, and the rear right wheel 11RR are sometimes referred to as "the wheels 11FL-11RR". When the front left wheel 11FL, the front right wheel 11FR, the rear left wheel 11RL, and the rear right wheel 11RR need not be distinguished from each other, each of them is sometimes referred to as a "wheel 11". When the front left wheel 11FL and the front right wheel 11FR need not be distinguished from each other, each of them is sometimes referred to as a "front wheel 11F". When the rear left wheel 11RL and the rear right wheel 11RR need not be distinguished from each other, each of them is sometimes referred to as a "rear wheel 11R". When the wheel supporting members 12FL-12RR need not be distinguished from each other, each of them is sometimes referred to as a "wheel supporting member 12".

The vehicle 10 further comprises a front left suspension 13FL, a front right suspension 13FR, a rear left suspension 13RL, and a rear right suspension 13RR.

The front left suspension 13FL includes a suspension arm 14FL, a shock absorber 15FL, and a suspension spring 16FL, to suspend the front left wheel 11FL from a vehicle body 10a.

The front right suspension 13FR includes a suspension arm 14FR, a shock absorber 15FR, and a suspension spring 16FR, to suspend the front right wheel 11FR from the vehicle body 10a.

The rear left suspension 13RL includes a suspension arm 14RL, a shock absorber 15RL, and a suspension spring 16RL, to suspend the rear left wheel 11RL from the vehicle body 10a.

The rear right suspension 13RR includes a suspension arm 14RR, a shock absorber 15RR, and a suspension spring 16RR, to suspend the rear right wheel 11RR from the vehicle body 10a.

The front left suspension 13FL, the front right suspension 13FR, the rear left suspension 13RL, and the rear right suspension 13RR are sometimes referred to as "the suspensions 13FL-13RR". When the front left suspension 13FL, the front right suspension 13FR, the rear left suspension 13RL, and the rear right suspension 13RR need not be distinguished from each other, each of them is sometimes referred to as a "suspension 13". When the suspension arms 14FL-14RR need not be distinguished from each other, each of them is sometimes referred to as a "suspension arm 14". When the shock absorbers 15FL-15RR need not be distinguished from each other, each of them is sometimes referred to as a "shock absorber 15". When the suspension springs 16FL-16RR need not be distinguished from each other, each of them is sometimes referred to as a "suspension spring 16".

The suspension arm 14 is connected to the wheel supporting member 12 that supports the wheel 11. It should be noted that, although only one suspension arm 14 is illustrated per one suspension 13 in FIG. 1, a plurality of the suspension arms 14 may be provided per one suspension 13.

The shock absorber 15 is disposed between the vehicle body 10a and the suspension arm 14. An upper end of the shock absorber 15 is connected to the vehicle body 10a. A lower end of the shock absorber 15 is connected to the suspension arm 14. The suspension spring 16 is elastically disposed between the vehicle body 10a and the suspension arm 14 through the shock absorber 15. Namely, an upper end of the suspension spring 16 is connected to the vehicle body 10a. A lower end of the suspension spring 16 is connected to a cylinder of the shock absorber 15. It should be noted that the shock absorber 15 may be disposed between the vehicle body 10a and the wheel supporting member 12 in a case where the suspension spring 16 is elastically disposed in a manner as described.

The shock absorber 15 in this embodiment is an invariable damping force shock absorber, however, the shock absorber 15 may be a variable damping force shock absorber. The shock absorber 15 may be disposed between the vehicle body 10a and the wheel supporting member 12. The shock absorber 15 and the suspension spring 16 may be disposed between the vehicle body 10a and the wheel supporting member 12. Furthermore, the suspension spring 16 may be elastically disposed between the vehicle body 10a and the suspension arm 14 without utilizing the shock absorber 15. Namely, the upper end of the suspension spring 16 may be connected to the vehicle body 10a and the lower end of the suspension spring 16 may be connected to the suspension arm 14. When the suspension spring 16 is elastically disposed in this manner, the shock absorber 15 and the suspension spring 16 may be disposed between the vehicle body 10a and the wheel supporting member 12.

A front left wheel active actuator 17FL, a front right wheel active actuator 17FR, a rear left wheel active actuator 17RL, and a rear right wheel active actuator 17RR are provided between the vehicle body 10a and the respective suspension arms 14. The front left wheel active actuator 17FL, the front right wheel active actuator 17FR, the rear left wheel active actuator 17RL, and the rear right wheel active actuator 17RR are referred to as "a front left wheel actuator 17FL, a front right wheel actuator 17FR, a rear left wheel actuator 17RL, and a rear right wheel actuator 17RR", respectively.

The front left wheel actuator 17FL, the front right wheel actuator 17FR, the rear left wheel actuator 17RL, and the rear right wheel actuator 17RR" are sometimes referred to as the "wheel actuators 17FR-17RR". When the front left wheel actuator 17FL, the front right wheel actuator 17FR, the rear left wheel actuator 17RL, and the rear right wheel actuator 17RR" need not be distinguished from each other, each of them is referred to as the "wheel actuator 17". When the front left wheel actuator 17FL and the front right wheel actuator 17FR need not be distinguished from each other, each of them is referred to as the "front wheel actuator 17F". When the rear left wheel actuator 17RL and the rear right wheel actuator 17RR need not be distinguished from each other, each of them is referred to as the "rear wheel actuator 17R".

The wheel actuator 17 is disposed/arranged in parallel with the shock absorber 15 and the suspension spring 16. The wheel actuator 17 functions as an actuator that variably generate, hydraulically or electro-magnetically, a force acting between the vehicle body 10a and the wheel 11. The wheel actuator 17 forms an active suspension together with the shock absorber 15, the suspension spring 16, and the like. The wheel actuator 17 may be a known actuator in the relevant technical field, as long as the wheel actuator 17 is controlled by an electronic control unit (hereinafter, referred to as an "ECU") 30 so that the wheel actuator 17 can generate the force (hereinafter, referred to as an "actuator force" or a "control force") acting between the vehicle body 10a and the wheel 11. The wheel actuator 17 is sometimes referred to as a "control force generating device", for the sake of convenience. The actuator force is sometimes referred to as a "control force", for the sake of convenience.

As shown in FIG. 2, the damping control apparatus 20 includes the ECU 30, an on-board memory device (on-board storing device other than a RAM) 30a, a vehicle state sensor 31, a navigation apparatus 32, and a radio communication device 33. The damping control apparatus 20 includes the front left wheel actuator 17FL, the front right wheel actuator 17FR, the rear left wheel actuator 17RL, and the rear right wheel actuator 17RR.

The ECU 30 is an electronic control unit that includes a microcomputer as a main component, and is sometimes referred to as a controller. The microcomputer includes a CPU, a ROM, a RAM, and an interface (I/F). The CPU is configured or programmed to realize various functions by executing instructions (or programs, or routines) stored in the ROM.

The ECU 30 is connected with the on-board memory device 30a that is a non-volatile, readable and writable storing device. Since the memory device 30a is on the vehicle 10, it sometimes referred to as a "vehicle memory device" or the "on-board memory device", for the sake of convenience. In the present embodiment, the memory device 30a is a hard disc drive. The ECU 30 is configured to be able to write/store information in the memory device 30a, and read/fetch the information stored in the memory device 30a. The memory device 30a is not limited to the hard disc drive, but may be a well-known non-volatile, readable and writable memory device or memory medium.

The ECU 30 is connected to the vehicle state sensor 31 so as to receive signals from various sensors included in the vehicle state sensor 31.

The vehicle state sensor 31 includes the various sensors, each detecting a state of the vehicle (i.e., a speed of the vehicle 10, an acceleration of the vehicle 10, a direction of the acceleration of the vehicle 10). The vehicle state sensor 31 includes following sensors.

A vehicle speed sensor for detecting a running/traveling speed (i.e., vehicle speed) of the vehicle 10.

wheel speed sensors, each of which is for detecting a wheel speed.

A front-rear direction acceleration sensor for detecting an acceleration in a front-rear direction of the vehicle 10.

A lateral direction acceleration sensor for detecting an acceleration in a lateral direction of the vehicle 10.

A yaw rate sensor for detecting a yaw rate of the vehicle 10.

The ECU 30 is connected to the navigation apparatus 32, and the radio communication device 33.

The navigation apparatus 32 includes a GNSS (Global Navigation Satellite System) receiver for detecting a present position of the vehicle 10, a map data base, and a display. The GNSS receiver receives signals transmitted from satellites (positioning satellites). The map data base has stored information including a road map information.

The navigation apparatus 32 obtains/specifies a present position of the vehicle 10 based on the signals received by the GNSS receiver. The navigation apparatus 32 performs, through calculation, a navigation guidance (route guidance) to a destination using the display, based on the present position of the vehicle 10 and the road map information (e.g., dynamic map) stored in the map data base.

The radio communication device 33 is a radio communication terminal configured to establish a communication with a server (in the present embodiment, the cloud 40) on the internet. The cloud 40 means a cloud computing. The cloud 40 includes a "database (memory) in which road surface displacement correlating information (described below) and position information (described below) are stored in such a manner that the road surface displacement correlating information and position information are associated with each other". The position information is information that can two-dimensionally specify a position on a road using a road longitudinal direction location and a road width direction location. The road surface displacement correlating information (hereinafter, sometimes abbreviated as "RSDC information") is information associating (correlating) with a "vertical displacement of the road" representative of concavity and convexity of the road surface. More specifically, in the present embodiment, the RSDC information is indicative of an unsprung mass displacement $z1$.

It should be noted that the RSDC information may be at least one of the followings.

Information indicative of a road surface vertical displacement z0

Information indicative of an unsprung mass displacement z1

Information indicative of a road surface vertical displacement rate dz0 that is a time derivative value of the road surface vertical displacement z0

Information indicative of an unsprung mass displacement rate dz1 that is a time derivative value of the unsprung mass displacement z1

The cloud 40 successively receives "the RSDC information and the position information" that a measurement vehicle(s) obtains/detects. The measurement vehicle is a vehicle that has a function to obtain/measure/detect the RSDC information and the position information and a function to transmit the obtained information (to the cloud 40).

The cloud 40 successively stores, in the database, "the RSDC information and the position information" that the cloud 40 has received from a plurality of measurement vehicles in such a manner that the RSDC information and the position information are associated/correlated with each other. It should be noted that "storing the RSDC information and the position information in the database" includes "updating the information in the database". Therefore, the database of the cloud 40 holds more accurate RSDC information.

It should be also noted that the measurement vehicle may be configured to measure/detect data used for calculating the RSDC information and to obtain through calculation the RSDC information based on the measured data, in place of directly measuring the RSDC information itself. Alternatively, the measurement vehicle may be configured to measure/detect data used for calculating the RSDC information and to transmit the measured data to the cloud 40. In this case, the cloud 40 performs data processing for the measured data to calculate the RSDC information so as to obtain the RSDC information, and stores the obtained RSDC information in the database.

The radio communication device 33 is configured to transmit information to and receive information from the cloud 40 through the internet connection. Therefore, the ECU 30 can obtain the RSDC information on an arbitrary position of the road from the database of the cloud 40 via communication using the radio communication device 33. The cloud 40 may sometimes be referred to as an "external storing device", because the cloud 40 is located outside of the vehicle 10 and has a function to store information.

Furthermore, the ECU 30 are connected to the front left wheel actuator 17FL, the front right wheel actuator 17FR, the rear left wheel actuator 17RL, and the rear right wheel actuator 17RR, through unillustrated drive circuits.

The ECU 30 obtains through calculation a target actuator force Fct for damping (decreasing) a vibration of the sprung mass (sprung member) of the wheel 11. The ECU 30 instructs the wheel actuator 17 to generate/output an actuator force Fc corresponding (equal) to the target actuator force Fct. The thus instructed wheel actuator 17 generates/outputs the actuator force Fc corresponding (equal) to the target actuator force Fct.

<Outline of Basic Preview Damping Control>

Figure 3:
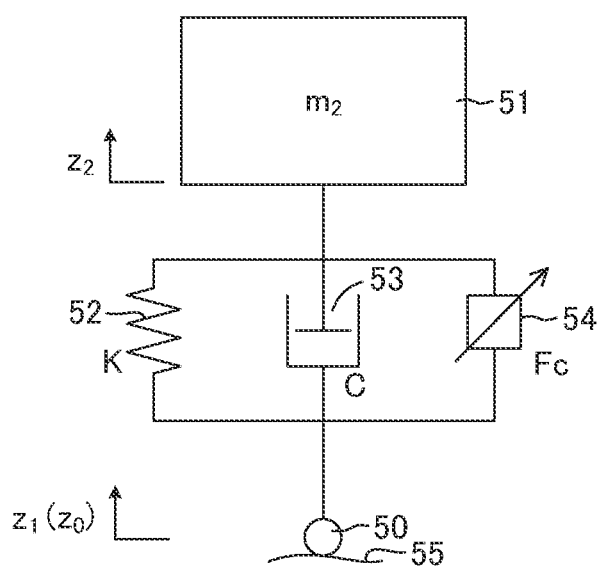
FIG. 3 is a figure illustrating a single/one wheel model of the vehicle.

An outline of the basic preview damping control performed by the damping control apparatus 20 will next be described. FIG. 3 illustrates a single wheel model of the vehicle 10. A unsprung mass (unsprung mass member) 50 includes parts in the side of the wheel 11 with respect to the suspension spring 16 among parts such as the wheel 11, the shock absorber 15, or the like. A sprung mass (sprung member) 51 includes parts in the side of the vehicle body 10a with respect to the suspension spring 16 among parts such as the vehicle body 10a, the shock absorber 15, or the like.

A spring 52 corresponds to the suspension spring 16. A damper 53 corresponds to the shock absorber 15. An actuator 54 corresponds to the wheel actuator 17.

A mass of the sprung mass 51 is represented as a sprung mass m2. Vertical displacements of a road surface 55, the unsprung mass 50, and the sprung mass 51 are represented as a road surface vertical displacement z0, an unsprung mass displacement z1, and a sprung mass displacement z2, respectively. A spring constant (equivalent spring constant) of the spring 52 is represented as a constant K. A damping coefficient (equivalent damping coefficient) is represented as a damping coefficient C. A force generated by the actuator 54 is represented as an actuator force Fc. It should be noted that it is assumed that the damping coefficient C is constant, however, the damping coefficient C may be a value varying depending on a time derivative value of a stroke of the suspension, since an actual damping coefficient varies depending on a stroke rate of the suspension.

Time derivative values of z1 and z2 are represented as dz1 and dz2, respectively. Second order time derivative values of z1 and z2 are represented as ddz1 and ddz2, respectively. The values of z0, z1, and z2 become positive when the respective parts move upward. The forces generated by the spring 52, the damper 53, and the actuator 54 have positive signs when direction of the forces generated by them is upward.

In the single wheel model shown in FIG. 3, a motion equation regarding a vertical direction movement of the sprung mass 51 is expressed as an equation (1) below.

$$m2 \cdot ddz2 = C \cdot (dz1 - dz2) + K \cdot (z1 - z2) - Fc \qquad (1)$$

When the vibration is completely cancelled (eliminated) by the actuator force Fc (in other words, when the acceleration ddz2, the rate dz2, and the displacement z2, of the sprung mass 51 are made to be zero), the actuator force Fc is expressed as an equation (2) below.

$$Fc = C \cdot dz1 + K \cdot z1 \qquad (2)$$

Thus, the actuator force Fc that can cancel the vibration of the sprung mass 51 can be expressed as an equation (3) below. In the equation (3), $\alpha$ is an arbitrary constant that is larger than 0, and equal to or smaller than 1.

$$Fc = \alpha \cdot (C \cdot dz1 + K \cdot z1) \qquad (3)$$

By applying the equation (3) to the equation (1), the equation (1) can be expressed as an equation (4) below.

$$m2 \cdot ddz2 = C \cdot (dz1 - dz2) + K \cdot (z1 - z2) - \alpha(C \cdot dz1 + K \cdot z1) \qquad (4)$$

When a Laplace transform is performed for the equation (4), and then the result is deformed, the equation (4) can be expressed as an equation (5) below. In the equation (5), "s" represents a Laplace operator.

$$\frac{z_2}{z_1} = \frac{(1-\alpha)(Cs + K)}{m_2 s^2 + Cs + K} \qquad (5)$$

As understood from the equation (5), a magnitude of the transfer function varies depending on $\alpha$, and becomes minimum when $\alpha$ is equal to 1. Therefore, the target actuator force Fct may be expressed as an equation (6) below wherein $\alpha \cdot C$ and $\alpha \cdot K$ in the equation (3) are replaced with gains $\beta 1$ and $\beta 2$, respectively.

$$Fct = \beta 1 \cdot dz1 + \beta 2 \cdot z1 \quad (6)$$

In view of the above, the ECU 30 obtains in advance the unsprung mass displacement z1 at a position at which the wheel 11 will reach (pass through), and obtains the unsprung mass displacement rate dz1 at the position, and applies them to the equation (6) that uses the gains $\beta 1$ and $\beta 2$ that have been adjusted appropriately so as to obtain through calculation the target actuator force Fct for the actuator 54. The ECU 30 lets the actuator 54 generate the actuator force Fc corresponding (equal) to the calculated/obtained target actuator force Fct at a time point at which an actual unsprung mass displacement becomes equal to the unsprung mass displacement z1 applied to the equation (6). In this manner, the amplitude of the vibration of the sprung mass 51 of when the actual unsprung mass displacement becomes equal to the unsprung mass displacement z1 applied to the equation (6) can be decreased.

It should be noted that the target actuator force Fct for the actuator 54 can be calculated using an equation (7) below in place of the equation (6). The equation (7) is different from the equation (6) only in that the derivative term ($\beta 1 \cdot dz1$) in the equation (6) is omitted. In this case as well, since the actuator force Fc ($=\beta 2 \cdot z1$) to cancel the vibration of the sprung mass 51 is generated from the actuator 54, the amplitude of the vibration of the sprung mass 51 can be decreased as compared to a case where the actuator force Fc is not generated.

$$Fct = \beta 2 \cdot z1 \quad (7)$$

In this manner, the ECU 30 obtains, using the equation (6) or the equation (7), the target actuator force Fct based on the unsprung mass displacement z1 at a predicted passing through position of the wheel 11 that is the position of when the actual unsprung mass displacement becomes equal to the unsprung mass displacement z1. The ECU 30 controls the wheel actuator 17 (i.e., sends an instruction to the wheel actuator 17 before the wheel 11 reaches the predicted passing through position) in such a manner that the wheel actuator 17 actually generates the actuator force Fc corresponding (equal) to the calculated/obtained target actuator force Fct at the time point at which the wheel 11 passes through (actually reaches) the predicted passing through position. This is the damping control of the sprung mass 51 and is referred as the preview damping control.

It should be noted that, in the above single wheel model, a mass of the unsprung mass 50 and an elastic deformation of tire are ignored so that the road surface vertical displacement z0 is deemed to be substantially the same as the unsprung mass displacement z1. Therefore, the preview damping control can be carried out using the road surface vertical displacement z0 in place of the unsprung mass displacement z1.

Figure 4:
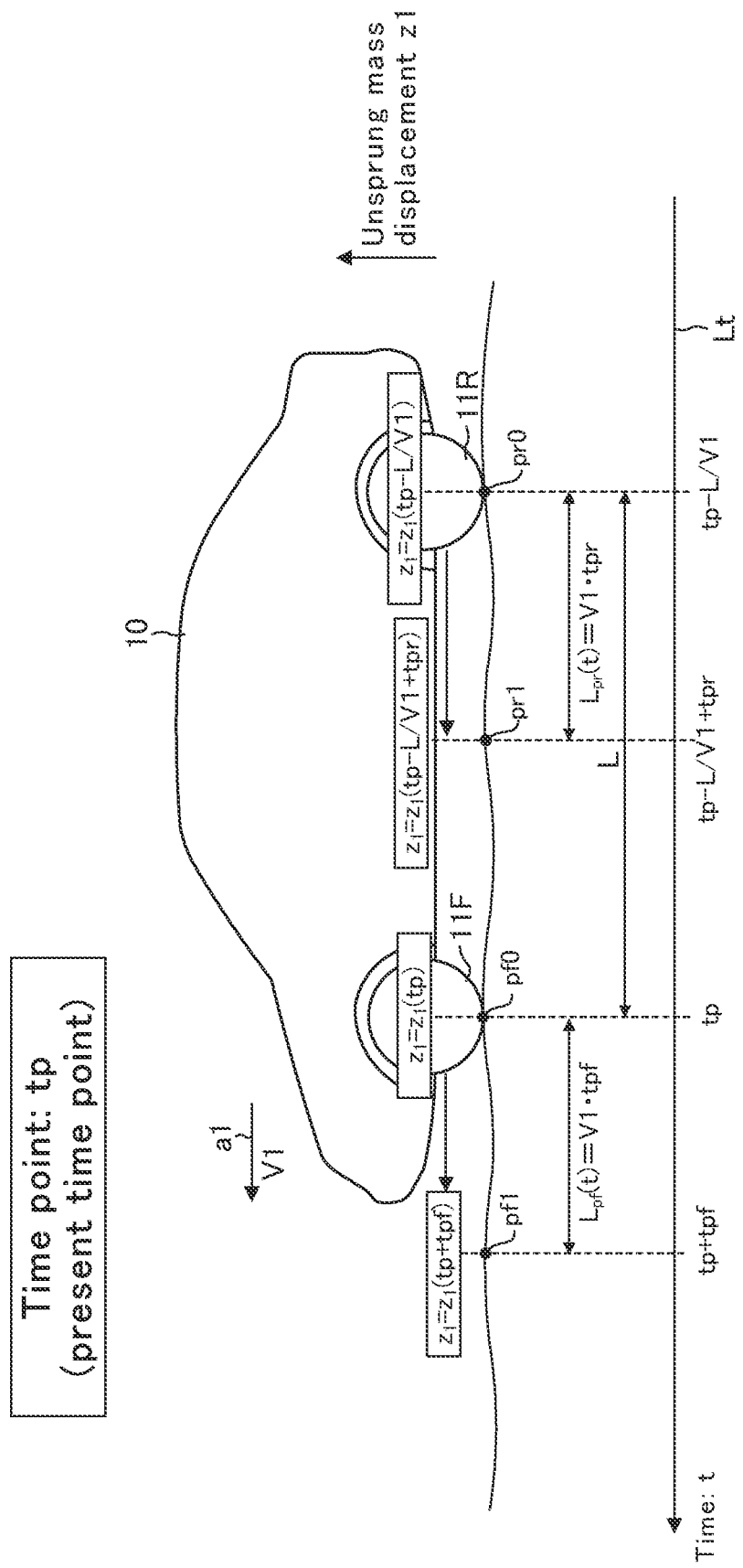
FIG. 4 is a figure for describing a preview damping control of the embodiment.
Figure 5:
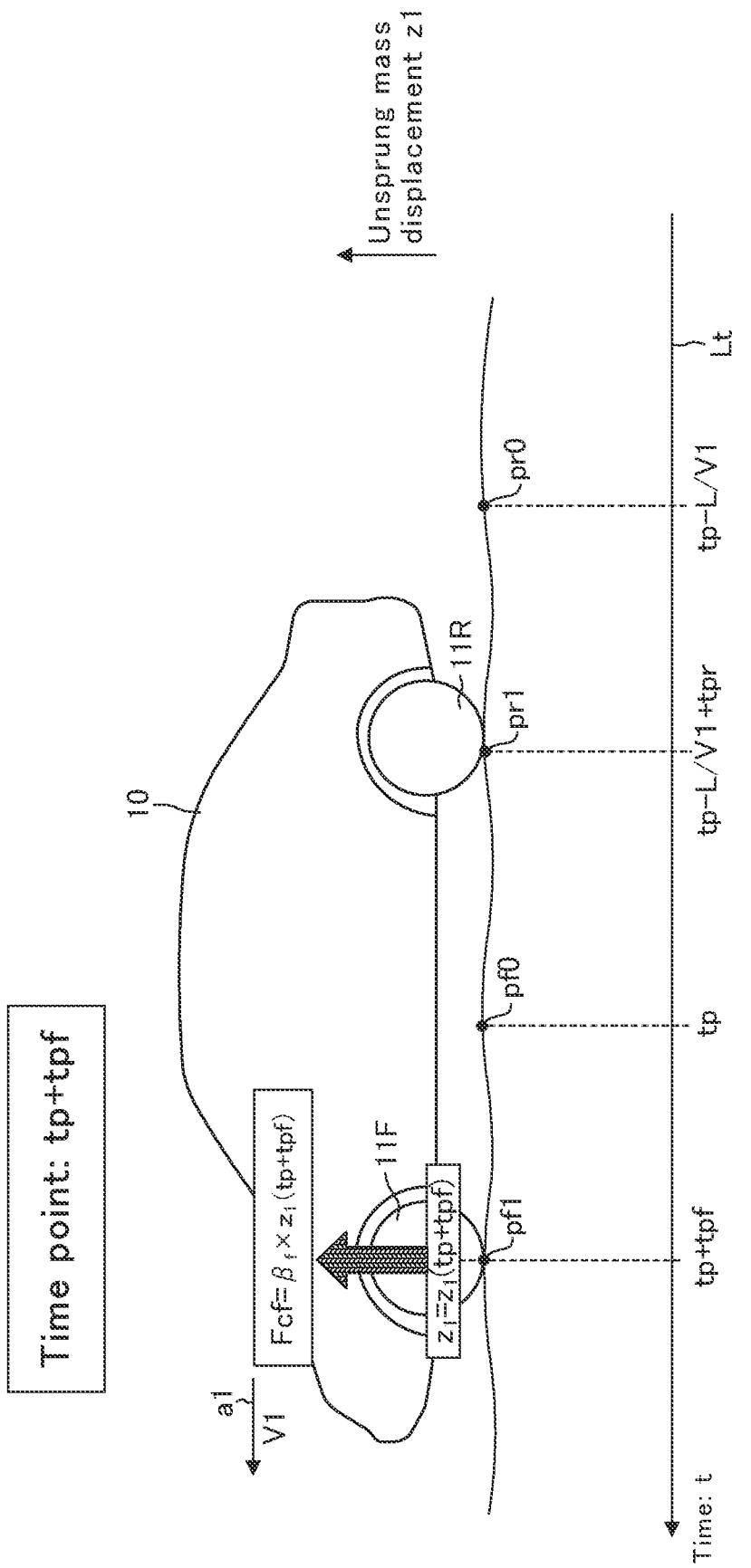
FIG. 5 is a figure for describing the preview damping control.
Figure 6:
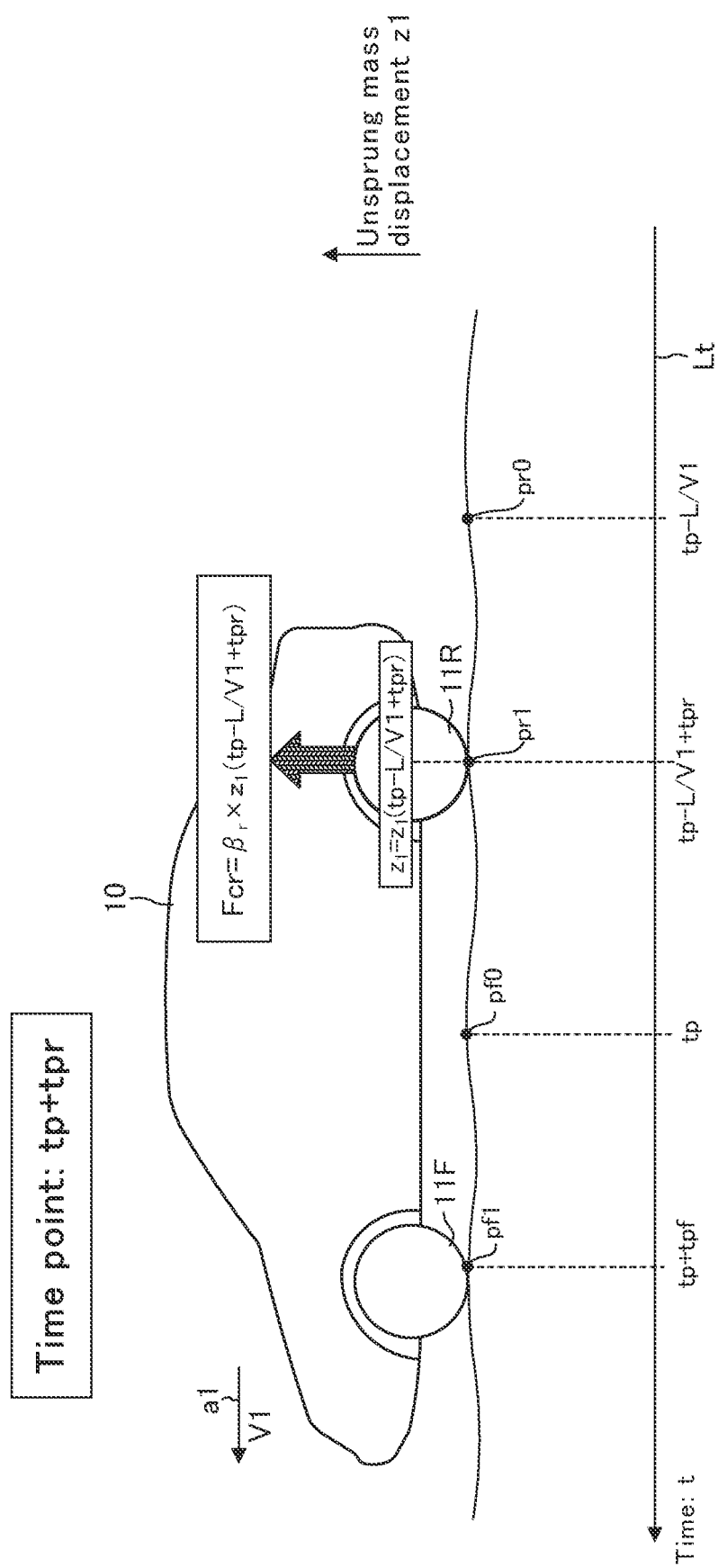
FIG. 6 is a figure for describing the preview damping control.

The preview damping control using the unsprung mass displacement z1 and the equation (7) will next be described in more detail with reference to FIGS. 4 to 6. FIG. 4 illustrates the vehicle 10 that is running/traveling at a vehicle speed V1 in a direction shown by an arrow a1 at the present time point tp. In the following descriptions, the front wheel 11F and the rear wheel 11R represent wheels on the same side of the vehicle 10 (i.e., either "the front left wheel 11FL and the rear left wheel 11RL" or "the front right wheel 11FR and the rear right wheel 11RR"). It is assumed that each of the moving speeds of the front wheel 11F and the rear wheel 11R is the same as the vehicle speed V1.

In FIG. 4, the unsprung mass displacement z1 of the front wheel 11F on a movement route of the front wheel 11F is expressed as a function z1 ($t$), wherein t is a time. The time t can represent a present time point, a time point in the past, and a time point in the future. A line Lt represents time t. Accordingly, the unsprung mass displacement z1 of the front wheel 11F at a position (tire-ground contact point) pf0 at the present time point tp is expressed as z1(tp). The movement route of the front wheel 11F may sometimes referred to as a "front wheel movement route".

It is further assumed that a movement route of the rear wheel 11R is the same as the front wheel movement route. Under this assumption, the unsprung mass displacement z1 of the rear wheel 11R of the vehicle 10 at a position (tire-ground contact point) pr0 at the present time point tp is expressed as z1(tp−L/V1) that is an unsprung mass displacement z1 at a time point (tp−L/V1). L is a length of a wheel base of the vehicle 10.

Namely, the unsprung mass displacement z1 of the rear wheel 11R is equal to the unsprung mass displacement z1 (tp−L/V1) at the time point (tp−L/V1) that is a "time length (L/V1) required for the front wheel 11F to move for the wheel base length L" before the present time point tp.

The ECU 30 specifies (predicts) a predicted passing through position pf1 of the front wheel 11F at a time point (in the future) a front wheel foresee time tpf after the present time point tp. The front wheel foresee time tpf has been set at a time length of a period from a first time point to a second time point. The first time point is a time point at which the ECU 30 specifies the predicted passing through position pf1 of the front wheel 11F, determines the target actuator force Fcft based on the unsprung mass displacement z1 at the predicted passing through position pf1, and instructs the front wheel actuator 17F to generate the actuator force Fcf corresponding/equal to the target actuator force Fcft. The second time point is a time point at which the front wheel actuator 17F actually generates the actuator force Fcf that is equal to the target actuator force Fcft.

The predicted passing through position pf1 of the front wheel 11F is a position of the front wheel 11F on the front wheel movement route of when the front wheel 11F moves a distance Lpf(t) (=V1·tpf) from "the present position pf0 of the front wheel 11F at the present time point tp". Accordingly, the ECU 30 can specify the predicted passing through position pf1 of the front wheel 11F as follows.

The ECU 30 specifies/obtains "the position pf0 of the front wheel 11F, the vehicle speed V1, and the moving direction" of the vehicle 10, based on the information on the position of the vehicle 10 obtained from the navigation apparatus 32 (e.g., the present position of the vehicle 10 and a change in the position of the vehicle 10 with respect to time). The ECU 30 specifies the front wheel movement route based on "the position pf0 of the front wheel 11F, the vehicle speed V1, and the moving direction" of the vehicle 10. The ECU 30 specifies, as the predicted passing through position pf1 of the front wheel 11F, a "position on the front wheel movement route" that is the distance Lpf(t) ahead (away) from the position pf0 along the front wheel movement route, using the position pf0, the vehicle speed V1, the front wheel foresee time tpf, and the front wheel movement route.

In addition, the ECU 30 obtains through calculation the target actuator force Fcft based on the unsprung mass displacement z1 (tp+tpf) that is the unsprung mass displacement z1 at the specified predicted passing through position pf1 of the front wheel 11F.

More specifically, the ECU 30 successively obtains, from the cloud 40, data representing unsprung mass displacements z1 within a predetermined area that is ahead of the vehicle 10 and stores the data in the RAM temporarily. The data is data that allows the ECU 30 to specify the unsprung mass displacement z1 that is associated with the position information, based on the position information. The predetermined area is an area determined in advance in such a manner that the area can cover at least the predicted passing through position pf1 of the front wheel 11F and a predicted passing through position pr1 of the rear wheel 11R described later. The ECU 30 holds/stores temporarily the data representing unsprung mass displacements z1 within the predetermined area that covers the predicted passing through position pf1 and the predicted passing through position pr1 at least until predicted passing through position pf1 and the predicted passing through position pr1 are actually specified.

The ECU 30 calculates the target actuator force Fcft as follows, using the unsprung mass displacement z1(tp+tpf) at the predicted passing through position pf1 among the unsprung mass displacements z1 within the predetermined area that have been temporarily stored in the RAM. Namely, the ECU 30 obtains the unsprung mass displacement z1(tp+tpf) at the predicted passing through position pf1 from the stored data in the RAM, and the ECU 30 uses that unsprung mass displacement z1(tp+tpf) so as to obtain the target actuator force Fcft.

The ECU 30 calculates the target actuator force Fcft by applying the unsprung mass displacement z1(tp+tpf) at the predicted passing through position pf1 of the front wheel 11F to an equation (8) described below. In actuality, the ECU 30 obtains the target actuator force Fcft using an equation (9) below. The equation (8) is obtained by replacing "Fct" and $\beta 2$" in the equation (7) with "Fcft and $\beta f$", respectively.

$$Fcft=\beta f \cdot z1 \quad (8)$$

$$Fcft=\beta f \cdot z1(tp+tpf) \quad (9)$$

Thereafter, the ECU 30 sends an instruction to the front wheel actuator 17F so as to let the front wheel actuator 17F generate the actuator force Fcf equal to (corresponding to) the obtained target actuator force Fcft. As a result, as shown in FIG. 5, at a time point tp+tpf that is the front wheel foresee time tpf after the present time point tp, the front wheel actuator 17F generates the actuator force Fcf equal to (corresponding to) the obtained target actuator force Fcft.

Accordingly, at the time point at which the front wheel 11F actually reaches (passes through) the predicted passing through position pf1, the front wheel actuator 17F can generate the actuator force Fcf that can appropriately damp/control the vibration caused by the unsprung mass displacement z1 of the front wheel 11F at the predicted passing through position pf1.

Similarly, at the present time point tp, the ECU 30 specifies (predicts) a predicted passing through position pr1 of the rear wheel 11R at a time point (in the future) a rear wheel foresee time tpr after the present time point tp. The rear wheel foresee time tpr has been set at a time length of a period from a third time point to a fourth time point. The third time point is a time point at which the ECU 30 specifies the predicted passing through position pr1 of the rear wheel 11R, determines the target actuator force Fcrt based on the unsprung mass displacement z1 at the predicted passing through position pr1, and instructs the rear wheel actuator 17R to generate the actuator force Fcr corresponding/equal to the target actuator force Fcrt. The fourth time point is a time point at which the rear wheel actuator 17R actually generates the actuator force Fcr that is equal to the target actuator force Fcrt.

When a movement route of the rear wheel 11R is the same as (or is along) the front wheel movement route, the predicted passing through position pr1 of the rear wheel 11R is a position of the rear wheel 11R on the front wheel movement route of when the rear wheel 11R moves a distance Lpr(t) (=V1·tpr) from "the present position pr0 of the rear wheel 11R at the present time point tp". Accordingly, the ECU 30 can specify the predicted passing through position pr1 of the rear wheel 11R as follows.

The ECU 30 specifies, as the predicted passing through position pr1 of the rear wheel 11R, a "position on the front wheel movement route" that is the distance Lpr(t) ahead (away) from the position pr0 along the front wheel movement route, using the position pr0, the vehicle speed V1, the rear wheel foresee time tpr, and the front wheel movement route.

In addition, the ECU 30 obtains through calculation the target actuator force Fcrt based on the unsprung mass displacement z1 (tp−L/V1+tpr) that is the unsprung mass displacement z1 at the specified predicted passing through position pr1 of the rear wheel 11R.

More specifically, the ECU 30 obtains through calculation the target actuator force Fcrt as follows, using the unsprung mass displacement z1 (tp−L/V1+tpr) at the predicted passing through position pr1 among the unsprung mass displacements z1 within the predetermined area that have been temporarily stored in the RAM.

The ECU 30 calculates the target actuator force Fcrt by applying the unsprung mass displacement z1(tp−L/V1+tpr) at the predicted passing through position pr1 of the rear wheel 11R to an equation (10) described below. In actuality, the ECU 30 obtains the target actuator force Fcrt using an equation (11) below. The equation (10) is obtained by replacing "Fct" and $\beta 2$" in the equation (7) with "Fcrt and $\beta r$", respectively.

$$Fcrt=\beta r \cdot z1 \quad (10)$$

$$Fcrt=\beta r \cdot z1(tp-L/V1+tpr) \quad (11)$$

Thereafter, the ECU 30 sends an instruction to the rear wheel actuator 17R so as to let the rear wheel actuator 17R generate the actuator force Fcr equal to (corresponding to) the obtained target actuator force Fcrt. As a result, as shown in FIG. 6, at the time point tp+tpr that is the rear wheel foresee time tpr after the present time point tp, the rear wheel actuator 17R generates the actuator force Fcr equal to (corresponding to) the obtained target actuator force Fcrt.

Accordingly, at a time point at which the rear wheel 11R actually reaches (passes through) the predicted passing through position pr1, the rear wheel actuator 17R can generate the actuator force Fcr that can appropriately damp/control the vibration caused by the unsprung mass displacement z1 of the rear wheel 11R at the predicted passing through position pr1.

It should be noted that the ECU 30 may send an instruction to the rear wheel actuator 17R so as to let the rear wheel actuator 17R actually generate the actuator force Fcr equal to (corresponding to) a target actuator force Fcrt (=($\beta r$/$\beta f$) ·Fcft, Fcft=$\beta f$·z1(tp)) at a time point at which the rear wheel 11R reaches the position pf0 of the front wheel 11F, the target actuator force Fcrt being obtained based on the unsprung mass displacement z1(tp) at the position pf0 of the front wheel 11F at the present time point. This is the outline of the basic preview damping control performed by the damping control apparatus 20.

<Outline of Operation>

While the vehicle 10 is traveling in an area (referred to as a "communicably area") where the vehicle 10 (i.e., the radio communication device 33) can communicate with the cloud 40, the ECU 30 obtains (receives), through communication using the radio communication device 33, the road surface displacement correlating information (the RSDC information, in the present embodiment, the information on the unsprung mass displacement z1) of the predicted passing through positions of the wheel 11 necessary for the preview damping control. The ECU 30 utilizes the currently received RSDC information (i.e., the information on the unsprung mass displacement z1) to perform the preview damping control. The preview damping control utilizing the currently received RSDC information (i.e., the information on the unsprung mass displacement z1) that is obtained from the cloud 40 through the communication using the radio communication device 33 may be referred to as a "first preview damping control" for the sake of convenience.

Meanwhile, when the vehicle 10 is traveling in an area/section (i.e., the communications disruption area) where the vehicle 10 (i.e., the radio communication device 33) is hard to communicate with the cloud 40 using the radio communication device 33, the ECU 30 may not be able to obtain the RSDC information (i.e., the information on the unsprung mass displacement z1) of the predicted passing through positions of the wheel 11 necessary for the preview damping control through communication using the radio communication device 33. In view of this, before the vehicle 10 starts traveling in (or enter) the communications disruption area, the ECU 30 obtains the RSDC information (i.e., the information on the unsprung mass displacement z1) for the communications disruption area from the cloud 40 in advance, and stores the obtained RSDC information in the on-board memory device 30a. As mentioned above, the RSDC information (i.e., the information on the unsprung mass displacement z1) has been associated with the position information, and thus, can be used to specify the unsprung mass displacement z1 based on the position information. Timings at which the ECU 30 obtains the RSDC information (i.e., the information on the unsprung mass displacement z1) for the communications disruption area from the cloud 40 differ depending on whether or not a route along which the vehicle is going to travel has already been determined. While the vehicle 10 is traveling in the communications disruption area, the ECU 30 obtains the RSDC information (i.e., the information on the unsprung mass displacement z1) at/of/for the predicted passing through positions of the wheel 11 necessary for the preview damping control from the on-board memory device 30a, and uses the obtained information on the unsprung mass displacement z1 to perform the preview damping control. The preview damping control utilizing the RSDC information (i.e., the information on the unsprung mass displacement z1) that is obtained from the memory device 30a may be referred to as a "second preview damping control" for the sake of convenience.

Figure 7:
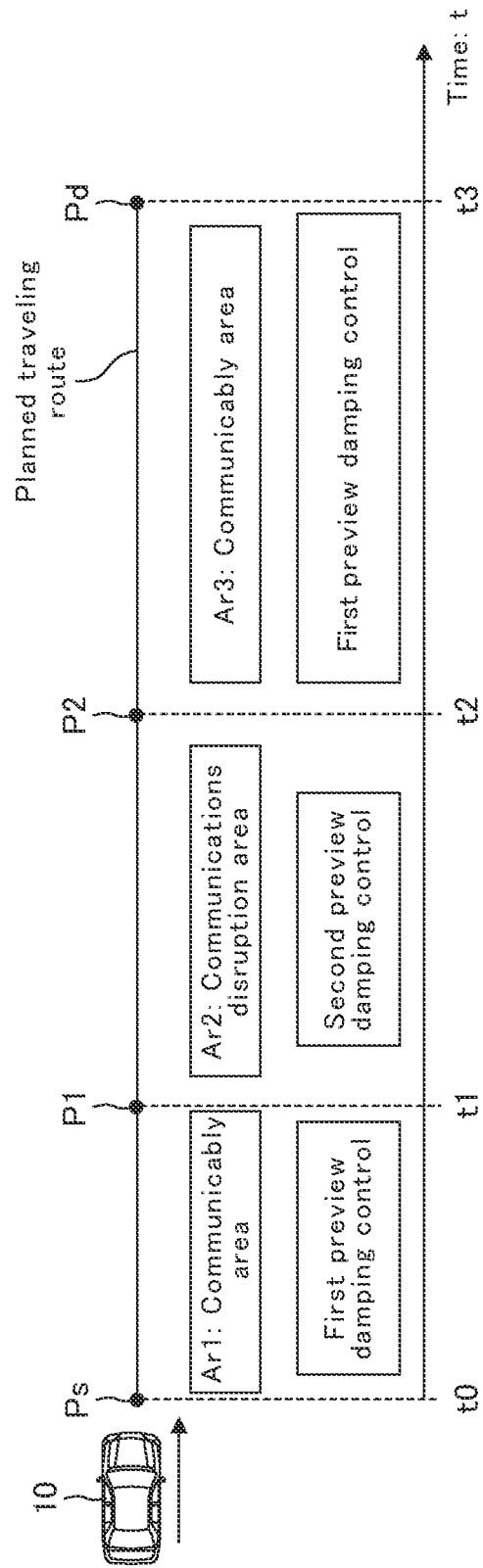
FIG. 7 is a figure for describing an outline of operation of the preview damping control apparatus of the embodiment.

Accordingly, as shown in FIG. 7, when the route along which the vehicle 10 will travel has already been determined as a planned traveling route so that the vehicle 10 runs along the planned traveling route from a departure point Ps to a destination point Pd (e.g., a guidance route determined by the navigation apparatus 32), the ECU 30 operates as follows.

At a time point t0, the ECU 30 specifies (extracts) a communications disruption area Ar2 (e.g., a tunnel) through which the planned traveling route passes, based on "the position information of the vehicle 10 and the road map information" obtained from the navigation apparatus 32. The ECU 30 downloads/fetches the information on the unsprung mass displacements z1 within the specified communications disruption area Ar2 from the cloud 40 and stores the downloaded information in the on-board memory device 30a (at the time point t0). This allows the ECU 30 to assuredly store the information on the unsprung mass displacements z1 within the specified communications disruption area Ar2 in the memory device 30a, before the vehicle 10 enters the communications disruption area Ar2.

While the vehicle 10 is traveling in a communicably area Ar1, the ECU 30 performs the first preview damping control. The ECU 30 switches the controls from the first preview damping control to the second preview damping control at a start point P1 of the communications disruption area Ar2. In a period (from the time point t1 to a time point t2) in which the vehicle 10 is traveling in the communications disruption area Ar2, the ECU 30 performs the second preview damping control. At the time point t2 at which the vehicle 10 reaches a start point P2 of a communicably area Ar3, the ECU 30 switches the controls from the second preview damping control to the first preview damping control. In a period (from the time point t2 to a time point immediately before the a time point t3) in which the vehicle 10 is traveling in the communicably area Ar3, the ECU 30 performs the first preview damping control.

Figure 8:
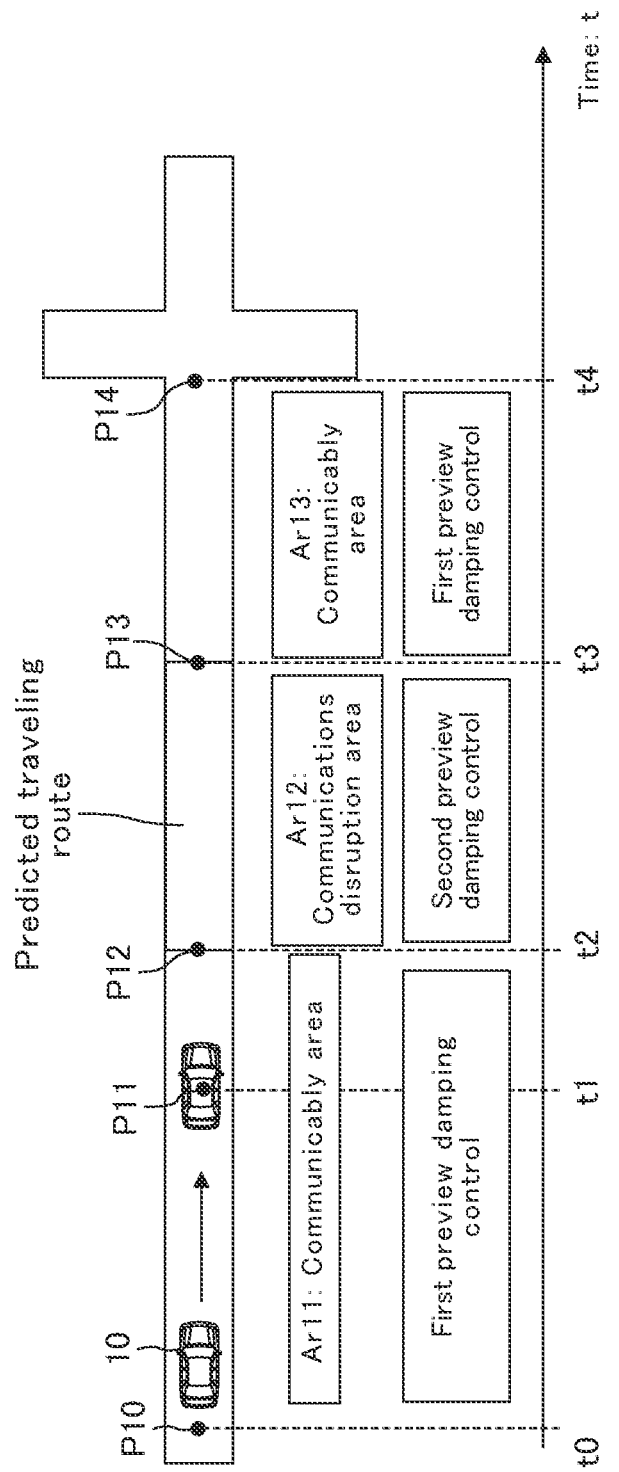
FIG. 8 is a figure for describing the outline of operation of the preview damping control apparatus.

Whereas, as shown in FIG. 8, when the route along which the vehicle 10 will travel has not been determined yet, the ECU 30 operates as follows. At a time point t0, the ECU 30 predicts a predicted traveling route that is a route along which the vehicle is predicted to travel, based on "the position, the vehicle speed, and the direction" of the vehicle 10 obtained from the navigation apparatus 32. For example, the ECU 30 specifies/predicts, as the predicted traveling route, a route from a present point P10 to a point P14 from which a road ahead of the vehicle 10 (along the moving direction of the vehicle 10) diverges or at which another road intersects with the road ahead of the vehicle 10.

The ECU 30 specifies (extracts) a communications disruption area Ar12, based on "the position information and the road map information" that is obtained from the navigation apparatus 32 at the time point t0.

While the vehicle 10 is traveling in a communicably area Ar11, the ECU 30 performs the first preview damping control. At a time point t1 at which the vehicle 10 reaches a point p11 that is a predetermined distance before an entrance of the communications disruption area Ar12, the ECU 30 downloads/fetches the information on the unsprung mass displacements z1 within the communications disruption area Ar12 from the cloud 40.

It should be noted that the predetermined distance has been determined based on a predicted download time that is predicted to be required to download all of the information on the unsprung mass displacements z1 within the communications disruption area Ar12. For example, the ECU 30 determines, as the predetermined distance, a distance obtained by multiplying the vehicle speed of the vehicle 10 at a predetermined time point (e.g., the present time point) by the predicted download time. The ECU 30 starts downloading the information on the unsprung mass displacements z1 within the communications disruption area Ar12 when the vehicle 10 reaches the point that is the thus determined distance before the entrance of the communications disruption area Ar12. It should be noted that the ECU 30 may adopt a distance, as the predetermined distance, obtained by adding a margin distance corresponding to a margin time to the above described obtained distance. This allows the ECU 30 to assuredly download and store the information on the unsprung mass displacements z1 within the communications disruption area Ar12 in the on-board memory device 30a, before the vehicle 10 enters the communications disruption area Ar12.

The ECU 30 switches the controls from the first preview damping control to the second preview damping control at a time point t2 at which the vehicle 10 reaches a start point (the entrance) P12 of the communications disruption area Ar12. In a period (from the time point t2 to a time point t3) in which the vehicle 10 is traveling in the communications disruption area Ar12, the ECU 30 performs the second preview damping control. At the time point t3 at which the vehicle 10 reaches a start point (the entrance) P13 of a communicably area Ar13, the ECU 30 switches the controls from the second preview damping control to the first preview damping control. In a period (from the time point t3 to a time point immediately before a time point t4) in which the vehicle 10 is traveling in the communicably area Ar13, the ECU 30 performs the first preview damping control.

The thus configured damping control apparatus 20 that operates as described above can obtain the unsprung mass displacement z1 of the wheel 11 from the memory device 30a, even when the vehicle 10 is traveling within the communications disruption area. Accordingly, the damping control apparatus 20 can perform the preview damping control (without requiring preview sensors) not only when the vehicle 10 is traveling within the communicably area but also when the vehicle 10 is traveling within the communications disruption area.

<Specific Operation>

The CPU (hereinafter, simply referred to as a "CPU") of the ECU 30 executes each of routines shown by flowcharts in FIGS. 9 to 12, every time a predetermined time elapses.

Figure 9:
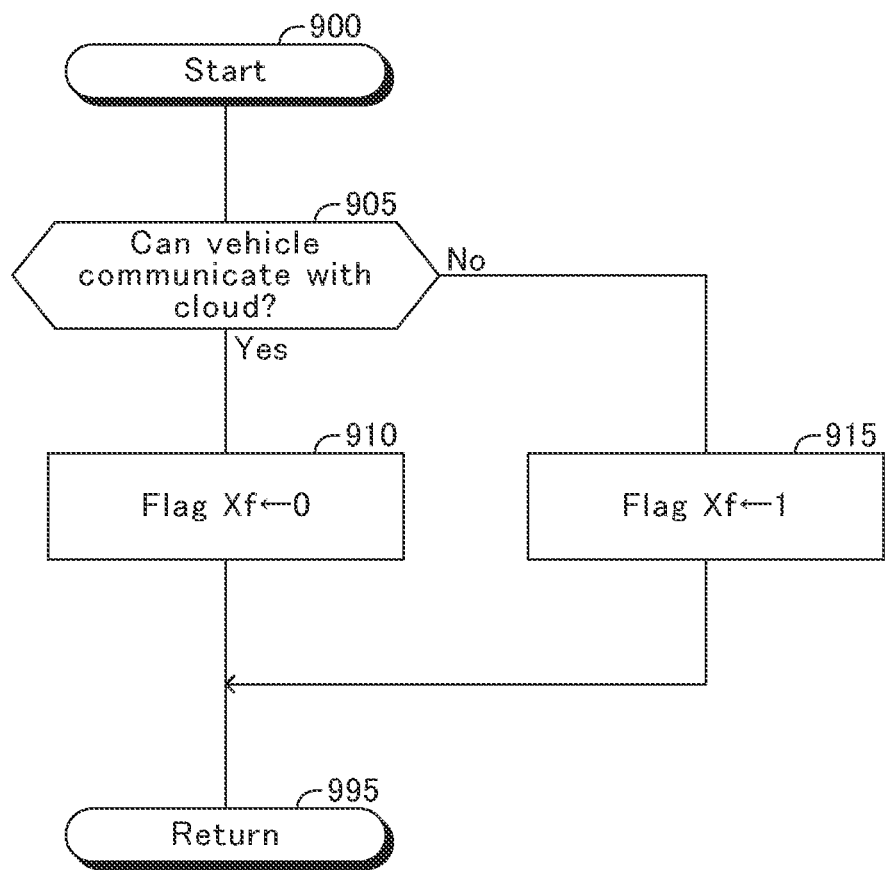
FIG. 9 is a flowchart showing a routine executed by a CPU of an Electric Control Unit shown in FIG. 2.

Accordingly, when an appropriate time comes, the CPU starts process of step 900 shown in FIG. 9, and proceeds to step 905 so as to determine whether or not the vehicle 10 (or the radio communication device 33 of the vehicle 10) is in a state where it can communicate with the cloud 40.

When the vehicle 10 is in the state where it can communicate with the cloud 40, the CPU makes a "Yes" determination at step 905, and proceeds to step 910 so as to set a value of the flag Xf to "0". The flag Xf indicates that the vehicle 10 is in the state where it can communicate with the cloud 40, when the value of the flag Xf is "0". The flag Xf indicates that the vehicle 10 is not in the state where it can communicate with the cloud 40, when the value of the flag Xf is "1". It should be noted that the value of the flag Xf is set to "0" through an initialization routine executed by the CPU when a position of an unillustrated ignition key switch is changed from an off position to an on position. Thereafter, the CPU proceeds to step 995 so as to terminate the present routine tentatively.

In contrast, when the vehicle 10 is not in the state where it can communicate with the cloud 40, the CPU makes a "No" determination at step 905, and proceeds to step 915 so as to set the value of the flag Xf to "1". Thereafter, the CPU proceeds to step 995 so as to terminate the present routine tentatively.

Figure 10:
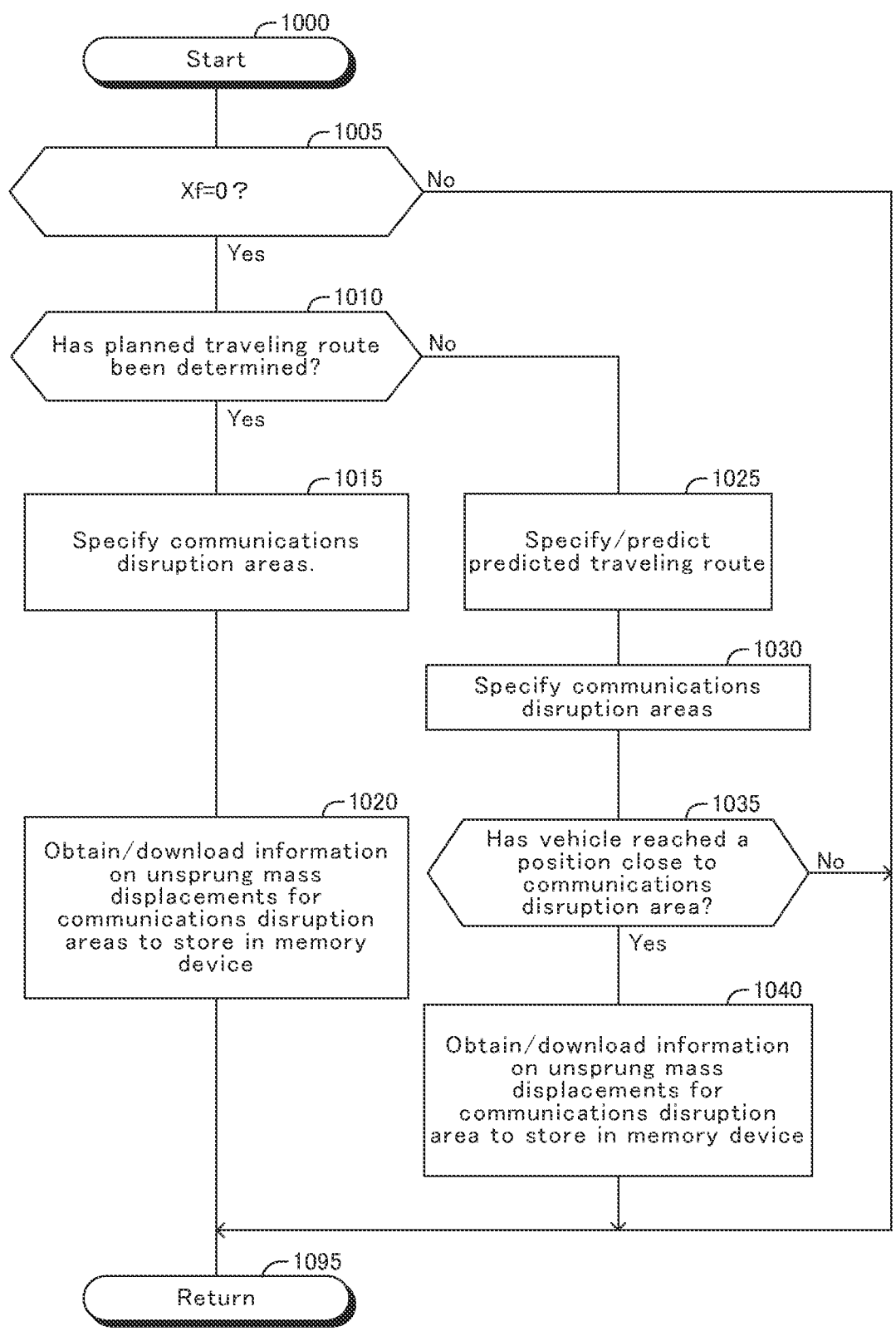
FIG. 10 is a flowchart showing a routine executed by the CPU of the Electric Control Unit.

When an appropriate time comes, the CPU starts process of step 1000 shown in FIG. 10, and proceeds to step 1005 so as to determine whether or not the value of the flag Xf is "0".

When the value of the flag Xf is not "0", the CPU makes a "No" determination at step 1005, and proceeds to step 1095 so as to terminate the present routine tentatively.

Whereas, when the value of the flag Xf is "0", the CPU makes a "Yes" determination at step 1005 and proceeds to step 1010 so as to determine whether or not a road (i.e., the planned traveling route) along which the vehicle 10 will travel has already been determined.

When the planned traveling route has already been determined, the CPU makes a "Yes" determination at step 1010, and sequentially executes processes of step 1015 and step 1020 described below, and proceeds to step 1095 so as to terminate the present routine tentatively.

Step 1015: the CPU extracts/specifies all communications disruption areas through which the planned traveling route passes/goes.

Step 1020: the CPU obtains/downloads the information on the unsprung mass displacements z1 (i.e., the information on the unsprung mass displacement z1 associated with the position information so that the displacement z1 can be specified based on the position information) for the extracted communications disruption areas from the cloud 40, and store the downloaded information in the on-board memory device 30a.

Whereas, when the planned traveling route has not been determined, the CPU makes a "No" determination at step 1010, and sequentially executes processes of step 1025 and step 1030 described below, and proceeds to step 1035.

Step 1025: the CPU specifies (predicts) the predicted traveling route that is the route along which the vehicle 10 is predicted to travel. For instance, the CPU determines, as the predicted traveling route, a route from the present position of the vehicle 10 to the point from which the road ahead of the vehicle 10 (along the moving direction of the vehicle 10) diverges, based on "the present position of the vehicle 10, a change in the position of the vehicle 10 with respect to time, and the road map information" obtained from the navigation apparatus 32.

Step 1030: the CPU extracts/specifies all communications disruption areas through which the predicted traveling route passes/goes, based on the road map information obtained from the navigation apparatus 32.

Step 1035: the CPU determines whether or not the vehicle 10 has reached a position close to the one of the extracted communications disruption areas (i.e., whether the vehicle 10 has reached a point/position that is the predetermined distance before an entrance of one of the extracted communications disruption areas).

If the vehicle 10 has not come close to the one of the extracted communications disruption areas, the CPU makes a "No" determination at step 1035, and proceeds to step 1095 so as to terminate the present routine tentatively.

Whereas, when the vehicle 10 has come close to the one of the extracted communications disruption areas, the CPU makes a "Yes" determination at step 1035, and executes a process of step 1040 described below, and proceeds to step 1095 so as to terminate the present routine tentatively.

Step 1040: the CPU downloads/fetches, from the cloud 40 through the radio communication device 33, the information on the unsprung mass displacement z1 (i.e., the information on the unsprung mass displacement z1 associated with the position information so that the displacement z1 can be specified based on the position information) within the communications disruption area which the vehicle 10 has come close to, and stores the downloaded information in the on-board memory device 30a.

Figure 11:
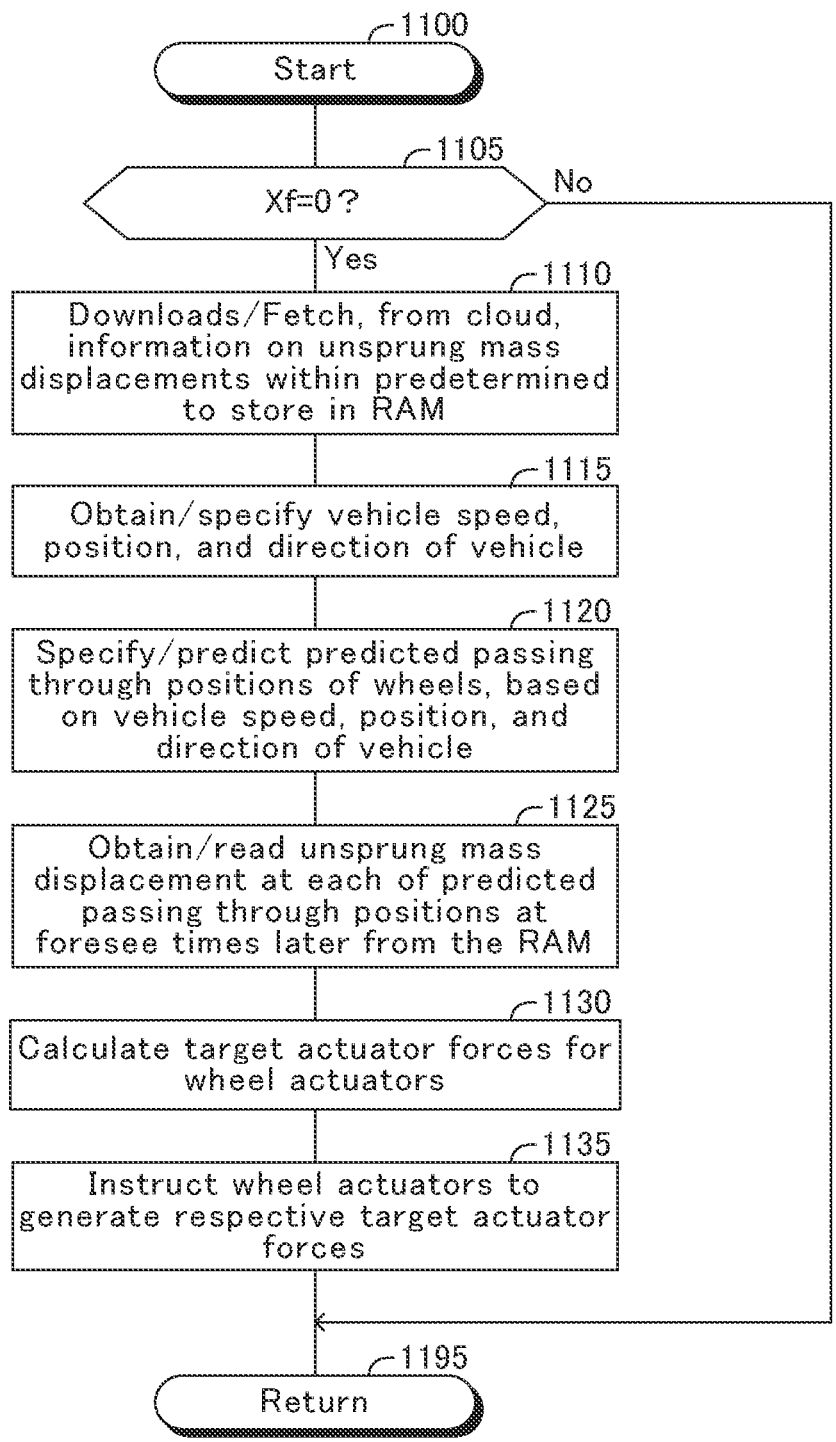
FIG. 11 is a flowchart showing a routine executed by the CPU of the Electric Control Unit.

When an appropriate time comes, the CPU starts process of step 1100 shown in FIG. 11, and proceeds to step 1105 so as to determine whether or not the value of the flag Xf is "0".

When the value of the flag Xf is not "0", the CPU makes a "No" determination at step 1105, and proceeds to step 1195 so as to terminate the present routine tentatively.

Whereas, when the value of the flag Xf is "0", the CPU makes a "Yes" determination at step 1105, and sequentially executes processes of step 1110 and step 1135 described below, and proceeds to step 1195 so as to terminate the present routine tentatively.

Step 1110: the CPU downloads/fetches, from the cloud 40 the information, on the unsprung mass displacements z1 (i.e., the information on the unsprung mass displacement z1 associated with the position information so that the displacement z1 can be specified based on the position information) within the predetermined area ahead of the vehicle, and stores the information in the RAM as described above.

Step 1115: the CPU obtains/specifies "the vehicle speed, the position, and the direction" of the vehicle 10 based on the information on the position of the vehicle 10 obtained from the navigation apparatus 32 (e.g., the present position of the vehicle 10 and a change in the position of the vehicle 10 with respect to time).

Step 1120: the CPU specifies (predicts) "the predicted passing through position of the front wheel 11F and the predicted passing through position pr1 of the rear wheel 11R" (at the foresee time after the preset time point), based on "the vehicle speed, the position, and the direction" of the vehicle 10.

Step 1125: the CPU obtains (reads) an unsprung mass displacement z1 at each of the predicted passing through positions from the RAM.

Step 1130: the CPU obtains through calculation, based on each of the obtained unsprung mass displacements z1, the target actuator forces for the wheel actuators 17FR to 17RR.

Step 1135: the CPU instructs the wheel actuators 17FR to 17RR to generate the respective target actuator forces. As a result, the wheel actuators 17FR to 17RR generate the respective actuator forces corresponding to the respective target actuator forces at time points at which the respective wheels 11FR to 11RR pass through (reach) the respective predicted passing through positions.

Figure 12:
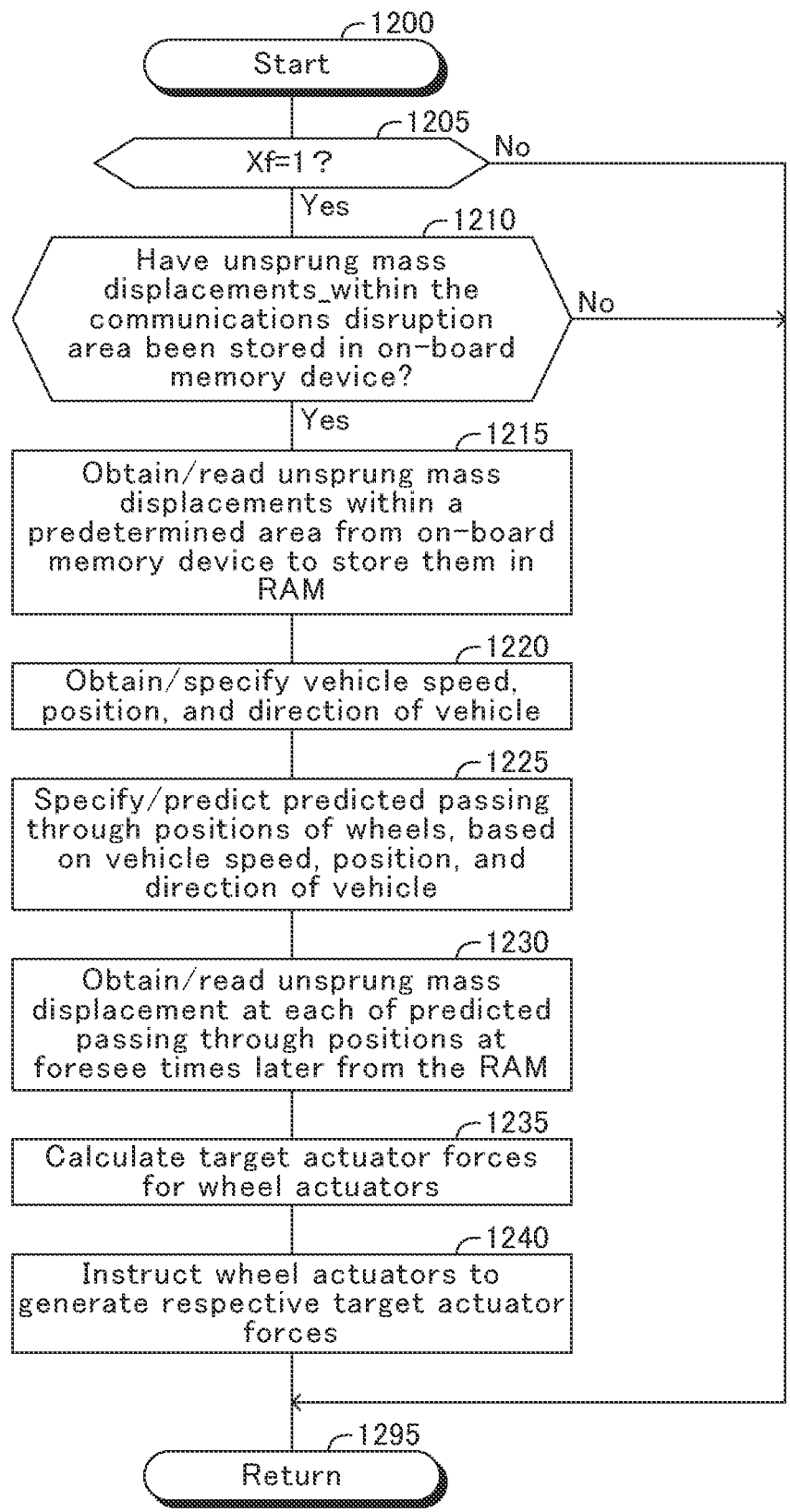
FIG. 12 is a flowchart showing a routine executed by the CPU of the Electric Control Unit.

When an appropriate time comes, the CPU starts process of step 1200 shown in FIG. 12, and proceeds to step 1205 so as to determine whether or not the value of the flag Xf is "1".

When the value of the flag Xf is not 1", the CPU makes a "No" determination at step 1205, and proceeds to step 1295 so as to terminate the present routine tentatively.

Whereas, when the value of the flag Xf is 1", the CPU makes a "Yes" determination at step 1205, and proceeds to step 1210 so as to determine whether or not the information on the unsprung mass displacements z1 within the communications disruption area in which the vehicle 10 is traveling has been stored in the on-board memory device 30*a*.

When the information on the unsprung mass displacements z1 within the communications disruption area in which the vehicle 10 is traveling has not been stored in the memory device 30*a*, the CPU makes a "No" determination at step 1210, and proceeds to step 1295 so as to terminate the present routine tentatively. In this case, the preview damping control is not carried out.

Whereas, when the information on the unsprung mass displacements z1 within the communications disruption area in which the vehicle 10 is traveling has been stored in the memory device 30*a*, the CPU makes a "Yes" determination at step 1210, and sequentially executes processes of step 1215 to step 1240 described below. Thereafter, the CPU proceeds to step 1295 so as to terminate the present routine tentatively.

Step 1215: the CPU obtains (reads out) the information on the unsprung mass displacements z1 (i.e., the information on the unsprung mass displacement z1 associated with the position information so that the displacement z1 can be specified based on the position information) within (or that is belong to) a predetermined area ahead of the vehicle 10 from memory device 30*a*, and stores the read out information in the RAM temporarily.

Step 1220: the CPU obtains/specifies "the vehicle speed, the position, and the direction" of the vehicle 10 based on the information obtained from the vehicle state sensor 31. For example, the position of the vehicle 10 may be specified based on:

the position of an entrance of the communications disruption area (in which the vehicle is traveling);

a distance for which the vehicle travels from the position of the entrance (and the distance is obtained by integrating the vehicle speed); and a relative position of the vehicle 10 in a road width direction with respect to a center position of a lane in which the vehicle 10 is traveling, wherein the relative position may be determined/obtained based on the left and right lane markers (white lines) of the road recognized by an unillustrated camera sensor.

Step 1225: the CPU specifies the predicted passing through positions of the respective wheels 11FR to 11RR of the vehicle 10, based on "the vehicle speed, the position, and the direction" of the vehicle 10 obtained at step 1220.

Step 1230: the CPU obtains the unsprung mass displacements z1 of the respective predicted passing through positions from the RAM.

Step 1235: the CPU obtains through calculation the target actuator forces for the respective wheel actuators 17FR to 17RR based on the respective unsprung mass displacements z1.

Step 1240: the CPU instructs the wheel actuators 17FR to 17RR to generate the respective target actuator forces. As a result, the wheel actuators 17FR to 17RR generate the respective actuator forces corresponding to the respective target actuator forces at time points at which the respective wheels 11FR to 11RR pass through (reach) the respective predicted passing through positions.

As has been described above, the damping control apparatus 20 according to the embodiment of the present disclosure can carry out the preview damping control even when the vehicle 10 is traveling in the communications disruption area.

<Modifications>

The present disclosure is not limited to the above embodiment, but may employ various modifications within the scope of the present disclosure.

The suspensions 13FL to 13RR in the above embodiment may be replaced with any types of suspensions, as long as they allow the respective wheels 11FL to 11RR to move vertically relative to the vehicle body 10*a*, and may be independent suspensions. The suspension springs 16FL to 16RR may be any types of springs, including compression coil springs, and air springs.

In the above embodiment, the road surface displacement correlating information is the information on the unsprung mass displacement z1, however, the road surface displacement correlating information may be information on a road surface vertical displacement z0. It should be noted that the unsprung mass displacement z1 may be used as the road surface displacement correlating information for the preview damping control in order to effectively damp the vibration using the preview damping control, because the unsprung mass displacement z1 can be detected more accurately. Furthermore, the road surface displacement correlating information may be information regarding two or more of the unsprung mass displacement z1, the unsprung mass displacement rate dz1, the road surface vertical displacement z0, and the road surface vertical displacement rate dz0. The road surface displacement correlating information may be information regarding either the unsprung mass displacement rate dz1 or the road surface vertical displacement rate dz0. The road surface displacement correlating information may be processed by the ECU 30, and then be used for the preview damping control.

As long as the road surface displacement correlating information corresponding to (for) the communications disruption area is stored in the on-board memory device 30a before the vehicle 10 enters the communications disruption area, any methods can be employed for obtaining and storing the road surface displacement correlating information corresponding to the communications disruption area and is not limited to the above method in the embodiment.

The vehicle 10 may include an autonomous driving control apparatus configured to perform an autonomous driving control. In the autonomous driving control, the autonomous driving control apparatus acquires an autonomous driving route along which the vehicle 10 is planned to travel, and controls steering, braking, and driving of the vehicle 10 to let the vehicle 10 travel along the autonomous driving route. In this case, the planned traveling route described above may be the autonomous driving route.

The wheels 11 have the respective wheel actuators 17FR to 17RR in the above embodiment, however, only one of the wheels 11 may be equipped with the wheel actuator. Alternatively, two or more of the wheels 11 may be equipped with the respective wheel actuators.

In the above embodiment and the modifications, the wheel actuator 17 is used as a control force generating device that is a device for generating a control force, however, the control force generating device is not limited to the wheel actuator 17 as long as the control force generating device is configured to generate a control force acting vertically so as to damp/control the vibration of the sprung mass 51.

The control force generating device may be an active stabilizer device (not shown), that includes a front wheel active stabilizer device and a rear wheel active stabilizer device. The front wheel active stabilizer device is configured to generate a vertical control force (i.e., a front left wheel control force) in one of directions between the sprung mass 51 corresponding to the front left wheel 11FL and the unsprung mass 50 corresponding to the front left wheel 11FL and to generate a vertical control force (i.e., a front right wheel control force) in the other one of directions between the sprung mass 51 corresponding to the front right wheel 11FR and the unsprung mass 50 corresponding to the front right wheel 11FR. The rear wheel active stabilizer device is configured to generate a vertical control force (i.e., a rear left wheel control force) in one of directions between the sprung mass 51 corresponding to the rear left wheel 11RL and the unsprung mass 50 corresponding to the rear left wheel 11RL and to generate a vertical control force (i.e., a rear right wheel control force) in the other one of directions between the sprung mass 51 corresponding to the rear right wheel 11RR and the unsprung mass 50 corresponding to the rear right wheel 11RR. The thus configured active stabilizer device is well-known, and is disclosed in, for example, Japanese Patent Application Laid-Open No. 2009-96366 that is hereby incorporated by reference. It should be noted that the active stabilizer device may include only either the front wheel active stabilizer device or the rear wheel active stabilizer device.

The control force generating device may be a device configured to generate the vertical control force by increasing and decreasing a braking force or a driving force applied to the wheel 11 of the vehicle 10 with utilizing a geometry of the suspension 13. This type of control force generating device is well-known, and is disclosed in, for example, Japanese Patent Application Laid-Open No. 2016-107778 that is hereby incorporated by reference. When this device is employed, the ECU 30 calculates the braking force or the driving force to generate the control force corresponding to a target control force that corresponds to the target actuator force.

In addition, this type of device may include a drive device (e.g., an in-wheel motor) for applying the driving force to the wheel 11 and a brake device for applying the braking force to the wheel 11. In this case, the drive device may be a motor and/or an engine that can apply the driving force to either one of or both of the front wheels and the rear wheels. Furthermore, the control force generating device may include at least one of the drive device and the brake device.

The shock absorbers 15FL to 15RR may be replaced with the variable damping force shock absorbers so as to be the control force generating device. In this case, the ECU 30 controls a damping coefficient of each of the absorbers in such a manner that the damping force of the each of the absorbers varies depending on the target control force.

What is claimed is:

1. A preview damping control apparatus for a vehicle comprising:
   an on-board navigation apparatus, including a receiver that receives signals transmitted from positioning satellites and a map data base that has stored information including road map information in advance, configured to obtain a present position of the vehicle using the received signals transmitted from positioning satellites and to determine, based on the present position of the vehicle and the road map information stored in the map data base, a guidance route to a destination for providing a route guidance to a driver of the vehicle;
   a communication device configured to be able to communicate with outside of the vehicle;
   a control force generating device configured to generate a control force to a part corresponding to a wheel of the vehicle to damp a vibration of a sprung mass of the vehicle;
   a control unit configured to perform a preview damping control to damp the vibration of the sprung mass by letting the control force generating device generate, at a time point at which the wheel actually reaches a predicted passing through position which the wheel is predicted to reach and which is ahead of the wheel, the control force that corresponds to a force determined based on road surface displacement correlating information that correlates with a vertical displacement of a road surface at the predicted passing through position; and
   an on-board memory device configured to store the road surface displacement correlating information,
   wherein
   the control unit is configured to:
      obtain, through communication of the communication device, the road surface displacement correlating information from an external storage device that is located outside of the vehicle, and perform the preview damping control using the obtained road surface displacement correlating information, when the vehicle is traveling within a communicably area in which the vehicle can communicate with the external storage device;

specify, at a time point at which the navigation apparatus determines the guidance route, a communication disruption area through which the guidance route passes, wherein the communication disruption area is an area in which the vehicle is hard to communicate with the external storage device;

obtain, at the time point at which the navigation apparatus determines the guidance route, from the external storage device through communication of the communication device, the road surface displacement correlating information corresponding to the specified communication disruption area;

store the obtained road surface displacement correlating information in the on-board memory device, when the road surface displacement correlating information is obtained from the external storage device;

perform the preview damping control using the road surface displacement correlating information that has been stored in the on-board memory device, while the vehicle is traveling within the communication disruption area;

specify, when the navigation apparatus does not determine the guidance route, as a predicted traveling route, a route from a present position of the vehicle to a point from which a road ahead of the vehicle diverges, based on the present position of the vehicle, a change in a position of the vehicle with respect to time, and the road map information that has been stored in the map data base in advance, while the vehicle is traveling within the communicably area;

specify the communication disruption area within the predicted traveling route while the vehicle is traveling within the communicably area;

obtain, through communication of the communication device, the road surface displacement correlating information for the specified communication disruption area from the external storage device, at a time point at which the vehicle reaches a position predetermined distance before the specified communication disruption area while the vehicle is traveling within the communicably area;

store the obtained road surface displacement correlating information in the on-board memory device, when the road surface displacement correlating information is obtained from the external storage device; and perform the preview damping control using the road surface displacement correlating information that has been stored in the on-board memory device, while the vehicle is traveling within the communication disruption area.

2. The preview damping control apparatus for a vehicle according to claim 1, wherein the road surface displacement correlating information is information relating to an unsprung mass displacement that represents a vertical displacement of an unsprung mass of the vehicle.

3. The preview damping control apparatus for a vehicle according to claim 1, wherein the road surface displacement correlating information comprises information indicative of a road surface vertical displacement rate $dz0$ that is a time derivative value of a road surface vertical displacement $z0$.

4. The preview damping control apparatus for a vehicle according to claim 1, wherein the road surface displacement correlating information comprises information indicative of an unsprung mass displacement rate $dz1$ that is a time derivative value of the unsprung mass displacement $z1$.

5. The preview damping control apparatus for a vehicle according to claim 1, wherein the road surface displacement correlating information comprises:

information indicative of a road surface vertical displacement rate $dz0$ that is a time derivative value of a road surface vertical displacement $z0$, and information indicative of an unsprung mass displacement rate $dz1$ that is a time derivative value of the unsprung mass displacement $z1$.

6. The preview damping control apparatus for a vehicle according to claim 1, wherein the control unit is further configured to:

specify the predict passing through position of the wheel along the predicted traveling route based on a vehicle speed of the vehicle, the present position of the vehicle, and a direction of the vehicle, and calculate target actuator forces for generation by a wheel actuator of the wheel at a time point that the wheel passes through the predicted passing through position along the predicted traveling route.

* * * * *